(12) United States Patent
Ogino et al.

(10) Patent No.: US 10,593,940 B2
(45) Date of Patent: Mar. 17, 2020

(54) NEGATIVE ELECTRODE FOR POWER STORAGE DEVICE, POWER STORAGE, DEVICE AND ELECTRICAL DEVICE

(71) Applicant: SEMICONDUCTOR ENERGY LABORATORY CO., LTD., Atsugi-shi, Kanagawa-ken (JP)

(72) Inventors: Kiyofumi Ogino, Kanagawa (JP); Yumiko Yoneda, Kanagawa (JP); Rika Yatabe, Kanagawa (JP); Nobuhiro Inoue, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 37 days.

(21) Appl. No.: 16/025,109

(22) Filed: Jul. 2, 2018

(65) Prior Publication Data

US 2018/0309119 A1 Oct. 25, 2018

Related U.S. Application Data

(63) Continuation of application No. 14/534,275, filed on Nov. 6, 2014, now abandoned.

(30) Foreign Application Priority Data

Nov. 13, 2013 (JP) .................................. 2013-234633

(51) Int. Cl.
| | | |
|---|---|---|
| *H01M 4/134* | (2010.01) | |
| *H01M 4/38* | (2006.01) | |
| *H01M 4/62* | (2006.01) | |

(52) U.S. Cl.
CPC .......... *H01M 4/386* (2013.01); *H01M 4/134* (2013.01); *H01M 4/38* (2013.01); *H01M 4/625* (2013.01)

(58) Field of Classification Search
None
See application file for complete search history.

(56) References Cited

U.S. PATENT DOCUMENTS

| 4,786,429 A | 11/1988 | Mori et al. |
| 7,407,725 B2 | 8/2008 | Miyake et al. |
| (Continued) | | |

FOREIGN PATENT DOCUMENTS

| JP | 2004-288525 A | 10/2004 |
| JP | 2007-534122 | 11/2007 |
| (Continued) | | |

OTHER PUBLICATIONS

University Wafer (Year: 2019).*

(Continued)

*Primary Examiner* — Yoshitoshi Takeuchi
(74) *Attorney, Agent, or Firm* — Nixon Peabody LLP; Jeffrey L. Costellia

(57) ABSTRACT

A power storage device having high capacitance is provided. A power storage device with excellent cycle characteristics is provided. A power storage device with high charge and discharge efficiency is provided. A power storage device including a negative electrode with low resistance is provided. A negative electrode for the power storage device includes a current collector and an active material layer including a plurality of active material particles over the current collector. The active material particle is silicon, and the size of the silicon particle is greater than or equal to 0.001 μm and less than or equal to 7 μm.

8 Claims, 23 Drawing Sheets

(56) References Cited

U.S. PATENT DOCUMENTS

| | | |
|---|---|---|
| 7,960,061 B2 | 6/2011 | Jost et al. |
| 9,099,717 B2 | 8/2015 | Nakanishi |
| 9,218,916 B2 | 12/2015 | Hirohashi et al. |
| 9,362,556 B2 | 6/2016 | Kuriki et al. |
| 9,537,142 B2 | 1/2017 | Nakanishi |
| 9,653,728 B2 | 5/2017 | Hirohashi et al. |
| 9,680,272 B2 | 6/2017 | Ogino |
| 2011/0121240 A1* | 5/2011 | Amine ............... H01M 4/0402 252/502 |
| 2011/0287317 A1 | 11/2011 | Nakanishi |
| 2011/0291240 A1 | 12/2011 | Yamazaki |
| 2012/0064409 A1 | 3/2012 | Zhamu et al. |
| 2012/0141866 A1 | 6/2012 | Kuriki et al. |
| 2012/0156556 A1 | 6/2012 | Kuriki et al. |
| 2012/0308894 A1 | 12/2012 | Oguni et al. |
| 2012/0328951 A1 | 12/2012 | Hirohashi et al. |
| 2013/0004846 A1* | 1/2013 | Kim ..................... B82Y 30/00 429/213 |
| 2013/0052526 A1 | 2/2013 | Momo et al. |
| 2013/0052528 A1 | 2/2013 | Kuriki et al. |
| 2013/0164610 A1 | 6/2013 | Itakura et al. |
| 2013/0224603 A1 | 8/2013 | Chen et al. |
| 2013/0252097 A1 | 9/2013 | Xu et al. |
| 2013/0266875 A1 | 10/2013 | Matsumoto et al. |
| 2014/0057168 A1* | 2/2014 | Newbound ............. H01M 4/66 429/212 |
| 2016/0268598 A1 | 9/2016 | Kuriki et al. |
| 2017/0279239 A1 | 9/2017 | Ogino |
| 2017/0309904 A1 | 10/2017 | Hirohashi et al. |

FOREIGN PATENT DOCUMENTS

| | | |
|---|---|---|
| JP | 2008-052965 A | 3/2008 |
| JP | 2011-032541 A | 2/2011 |
| JP | 2012-009421 A | 1/2012 |
| JP | 2012-009429 A | 1/2012 |
| JP | 2012-138347 A | 7/2012 |
| JP | 2013-030462 A | 2/2013 |
| JP | 2013-030472 A | 2/2013 |
| JP | 2013-191552 A | 9/2013 |
| JP | 2013-197055 A | 9/2013 |
| WO | WO-2003/036751 | 5/2003 |
| WO | WO-2012/056765 | 5/2012 |
| WO | WO-2012/077692 | 6/2012 |

OTHER PUBLICATIONS

Wolf.S et al., "Silicon: Single Crystal Growth and Wafer Preparation", Silicon Processing for the VLSI Era, 1986, vol. 1, pp. 1-35, Lattice Press.

* cited by examiner $z(Li_{1-y}FePO_4 + yLi+ + ye-)$
$\rightarrow zLiFePO_4$
$y \leqq 1, y \times z = x$ $SiLi_x$
$\rightarrow Si + xLi+ + xe-$
$x \leqq 4.4$

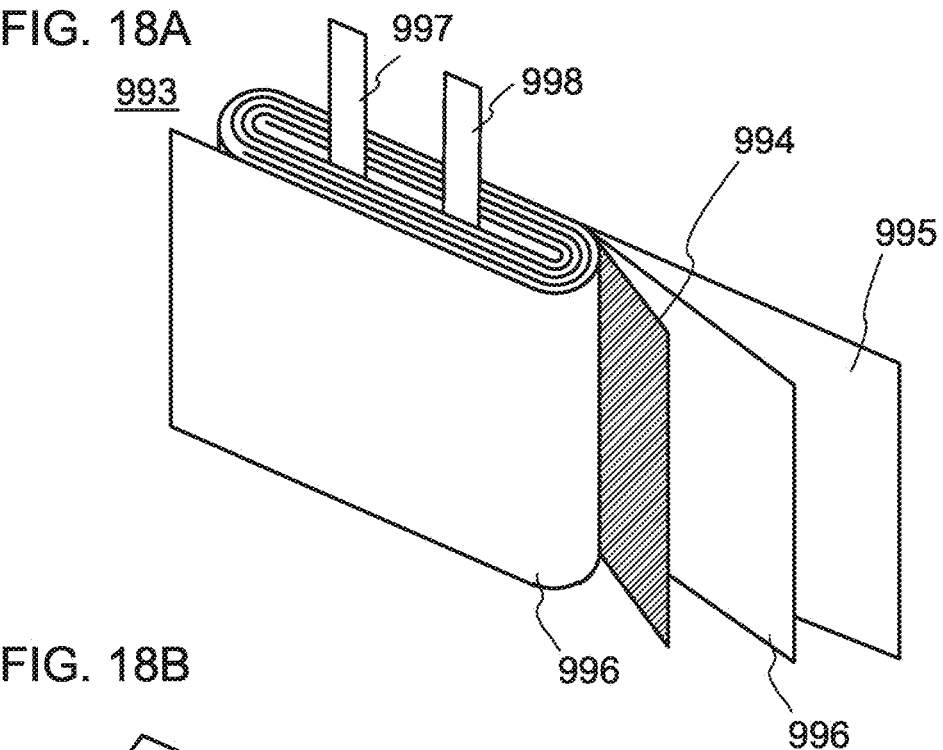
FIG. 18A
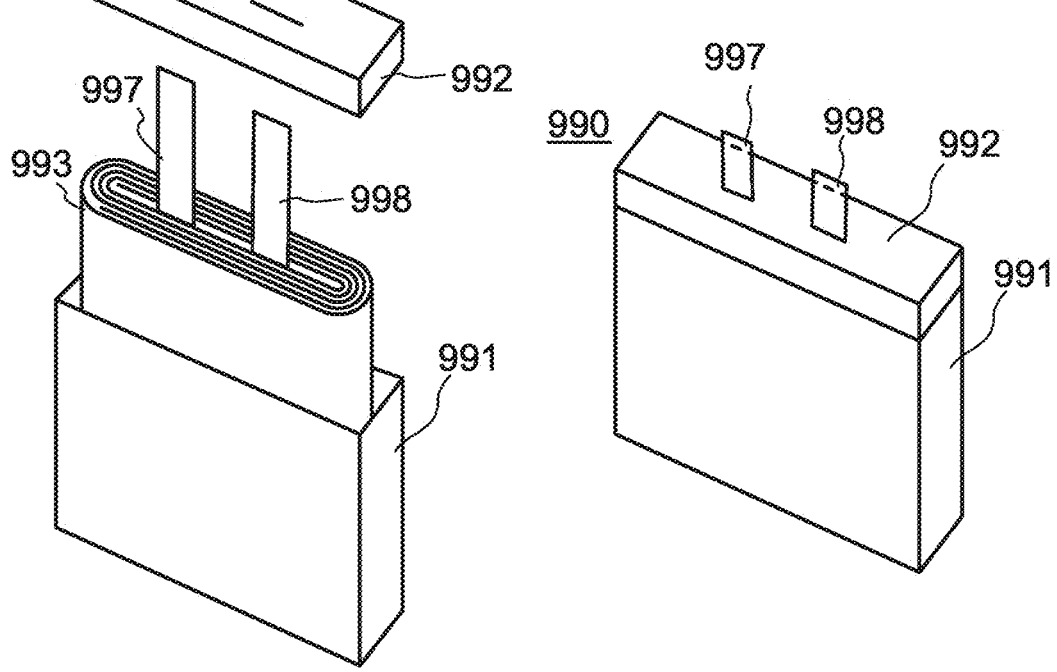
FIG. 18B
FIG. 18C

FIG. 20A1
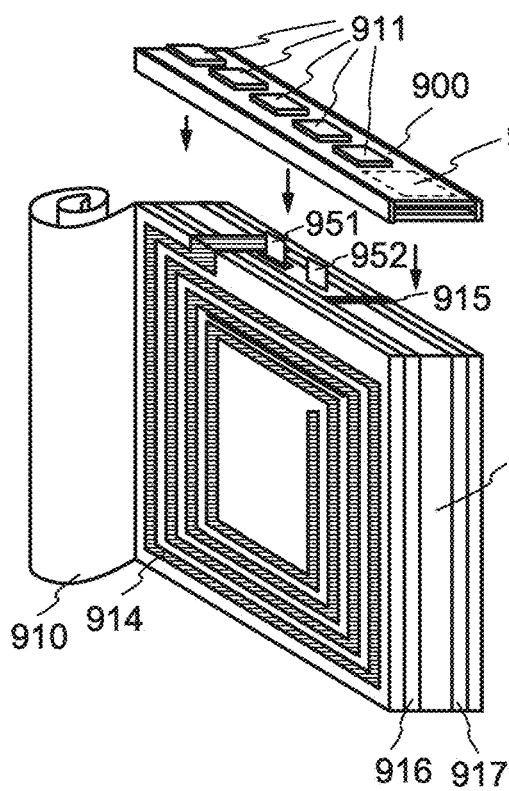
FIG. 20A2
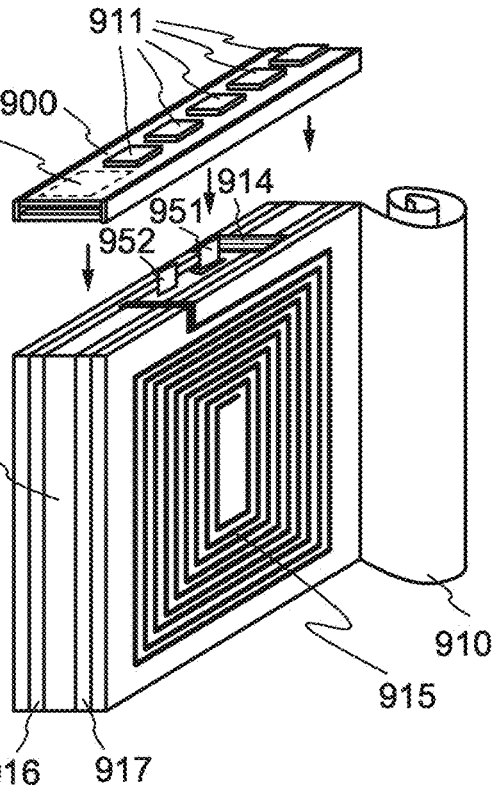
FIG. 20B1
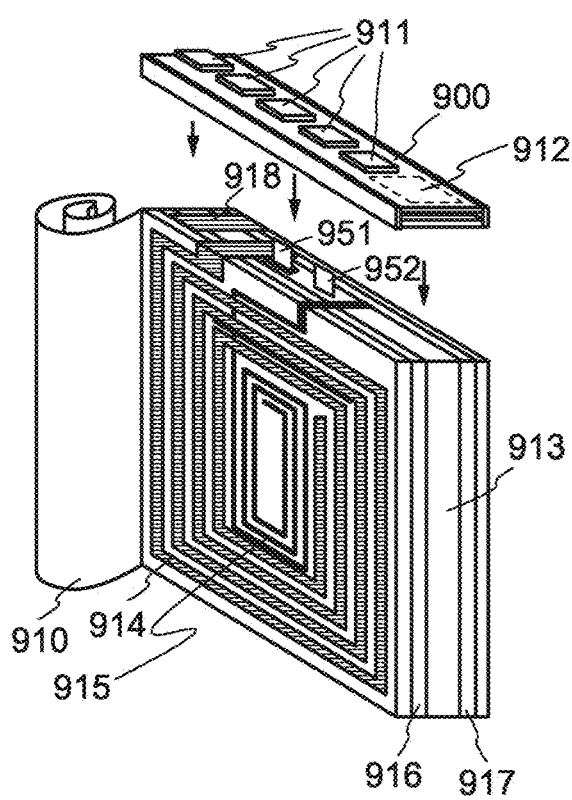
FIG. 20B2
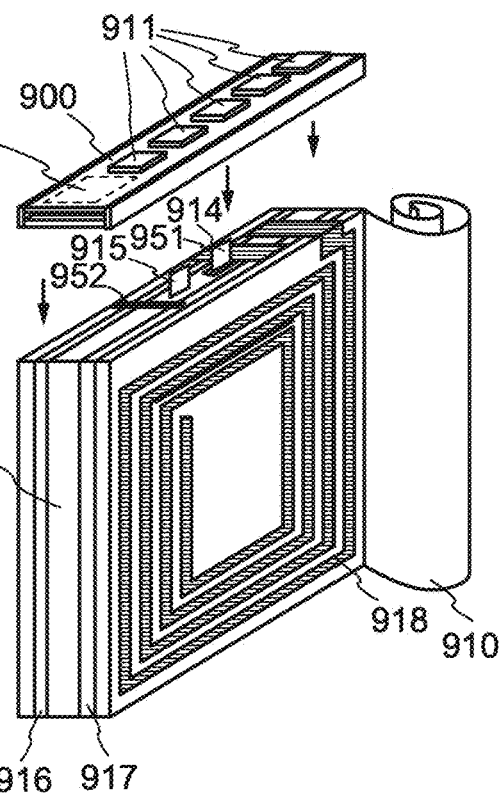

NEGATIVE ELECTRODE FOR POWER STORAGE DEVICE, POWER STORAGE, DEVICE AND ELECTRICAL DEVICE

BACKGROUND OF THE INVENTION

1. Field of the Invention

The present invention relates to an object, a method, or a manufacturing method. The present invention relates to a process, a machine, manufacture, or a composition of matter. One embodiment of the present invention relates to a semiconductor device, a display device, a light-emitting device, a power storage device, a driving method thereof, or a manufacturing method thereof. One embodiment of the present invention relates to a positive electrode active material, a secondary battery, and a manufacturing method thereof. In particular, one embodiment of the present invention relates to an electrode for a power storage device and a manufacturing method thereof.

2. Description of the Related Art

In recent years, portable electronic devices such as mobile phones, smartphones, electronic book (e-book) readers, and portable game machines have been widely used. Being used as power sources for driving these devices, power storage devices typified by lithium-ion secondary batteries have been researched and developed actively. Power storage devices are of growing importance in a variety of uses; for example, hybrid vehicles and electric vehicles receive attention because of an increased interest in global environmental problems and an oil resources problem.

A lithium-ion secondary battery, which is a power storage device and widely used because of its high energy density, includes a positive electrode including an active material such as lithium cobalt oxide ($LiCoO_2$) or lithium iron phosphate ($LiFePO_4$), a negative electrode formed of a carbon material such as graphite capable of receiving and releasing lithium ions, and an electrolytic solution in which an electrolyte formed of a lithium salt such as $LiBF_4$ or $LiPF_6$ is dissolved in an organic solvent such as ethylene carbonate (EC) or diethyl carbonate (DEC), for example. The lithium-ion secondary battery is charged and discharged in such a manner that lithium ions in the lithium-ion secondary battery move between the positive electrode and the negative electrode through the electrolytic solution and intercalated into or deintercalated from the positive electrode active material and the negative electrode active material.

Lithium-ion secondary batteries are widely used as power sources for driving portable electronic devices, electric vehicles, and the like, and there is a very great need for more compact and higher capacity lithium-ion secondary batteries.

Thus, electrodes formed of an alloy-based material of silicon, tin, or the like, instead of a carbon material such as graphite (black lead) that has been conventionally used as a negative electrode active material, have been actively developed. A negative electrode used in a lithium-ion secondary battery is fabricated by forming an active material on one surface of a current collector. Graphite that can receive and release ions serving as carriers (hereinafter referred to as carrier ions) has been conventionally used as a negative electrode active material. The negative electrode has been fabricated in such a manner that graphite as a negative electrode active material, carbon black as a conductive additive, and a resin as a binder are mixed to form slurry, and the slurry is applied to a current collector and dried.

Compared with carbon, silicon, which is a material alloyed and dealloyed with lithium, can increase capacity when used as a negative electrode active material. The negative electrode of carbon (graphite) has a theoretical capacity of 372 mAh/g, whereas the negative electrode of silicon has a dramatically high theoretical capacity of 4200 mAh/g, and thus silicon is an optimum material for higher capacity lithium-ion secondary batteries.

However, when the material that is alloyed and dealloyed with lithium (e.g., silicon) greatly expands and contracts with reception and release of carrier ions in charge and discharge cycles; therefore, when the amount of carrier ions received by the material increases, the contact state between an active material and a conductive additive, between active materials, and between an active material and a current collector becomes worse and a conductive path is lost in some cases. The loss of the conductive path decreases the capacity with charge and discharge cycles. Moreover, in some cases, silicon is deformed or broken to be separated from a current collector or pulverized, so that a function as a lithium-ion secondary battery becomes difficult to maintain.

In Patent Document 1, a silicon layer is formed over a current collector, and a conductive layer is formed over the silicon layer. This allows electrical connection between the silicon layer and the current collector to be maintained through the conductive layer even when the silicon layer is separated from the current collector because of repeated expansion and contraction of the silicon; thus, degradation of battery properties can be inhibited. Patent Document 1 also discloses that a silicon layer to which an impurity such as phosphorus or boron is added is used as the conductive layer.

REFERENCE

[Patent Document 1] Japanese Published Patent Application No. 2012-009429

SUMMARY OF THE INVENTION

An object of one embodiment of the present invention is to provide a power storage device having high capacitance. Another object of one embodiment of the present invention is to provide a power storage device with excellent cycle characteristics. Another object of one embodiment of the present invention is to provide a power storage device with high charge and discharge efficiency. Another object of one embodiment of the present invention is to provide a power storage device including a negative electrode with low resistance. Another object of one embodiment of the present invention is to provide a novel power storage device or the like.

In the case where a power storage device such as a secondary battery is used in a flexible display device, a flexible electronic device, or the like, the power storage device is provided in a flexible portion (part or the whole of a housing). In this case, the power storage device is bent with the flexible portion, so that repeated change in the form of the power storage device might cause separation between a current collector and an active material in the power storage device. As a result, deterioration of the power storage device might be promoted.

Another object of one embodiment of the present invention is to prevent deterioration of a power storage device caused by change in its form.

Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

One embodiment of the present invention is a negative electrode for a power storage device. The negative electrode includes a current collector and an active material layer including a plurality of active material particles over the current collector. The active material particle includes silicon, and the size of the silicon particle is greater than or equal to 0.001 μm and less than or equal to 7 μm.

In the above structure, the resistivity of silicon is preferably higher than or equal to $10^{-4}$ Ω·cm and lower than or equal to 50 Ω·cm.

Furthermore, in the above structure, the active material layer preferably includes an active material and a conductive additive, and the weight of the conductive additive is preferably less than or equal to 30% of the weight of the active material. In the above structure, the conductive additive is preferably graphene, and silicon preferably contains phosphorus or boron.

Another embodiment of the present invention is a power storage device including the negative electrode.

Another embodiment of the present invention is an electrical device including the above power storage device.

One embodiment of the present invention can provide a power storage device having high capacitance. One embodiment of the present invention can provide a power storage device with excellent cycle characteristics. One embodiment of the present invention is to provide a power storage device with high charge and discharge efficiency. One embodiment of the present invention can provide a power storage device including a negative electrode with low resistance. One embodiment of the present invention can provide a novel power storage device or the like. Note that the descriptions of these effects do not disturb the existence of other effects. One embodiment of the present invention does not necessarily achieve all the effects. Other effects will be apparent from and can be derived from the descriptions of the specification, the drawings, the claims, and the like.

BRIEF DESCRIPTION OF THE DRAWINGS

In the accompanying drawings:
FIGS. 18A to 18C illustrate an example of a power storage device;
FIGS. 20A1 to 20B2 illustrate examples of power storage devices.

DETAILED DESCRIPTION OF THE INVENTION

Embodiments and examples will be described below with reference to drawings. However, the embodiments and examples can be implemented in many different modes, and it will be readily appreciated by those skilled in the art that modes and details thereof can be changed in various ways without departing from the spirit and scope of the present invention. Thus, the present invention should not be interpreted as being limited to the following descriptions of the embodiments and examples.

(Embodiment 1)

In this embodiment, a negative electrode and an electrolyte and solvent of an electrolytic solution that are used in a power storage device of one embodiment of the present invention will be described. In addition, a method for fabricating a negative electrode will be described.

[Negative Electrode Structure 1]

Figure 1A:
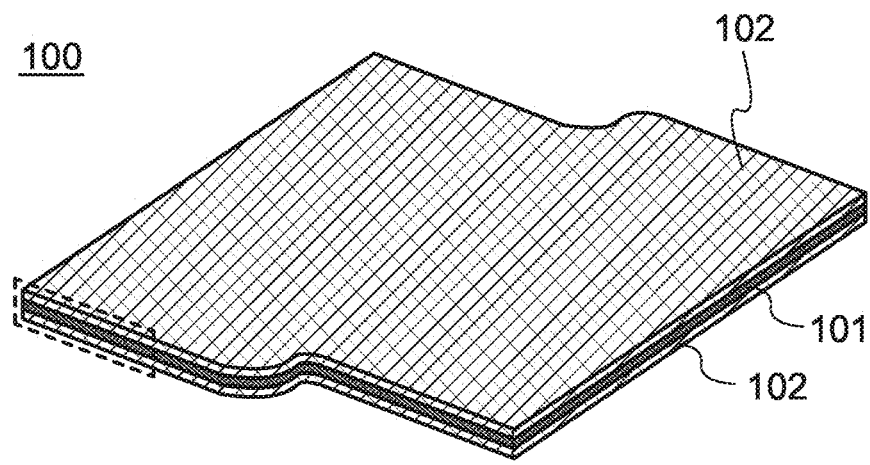
FIGS. 1A and 1B illustrate a negative electrode.
Figure 1B:
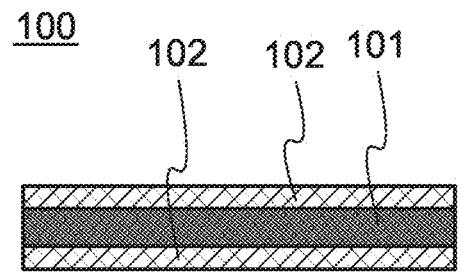

FIG. 1A is an overhead view of a negative electrode, and FIG. 1B is a cross-sectional view of a portion surrounded by a broken line in FIG. 1A. A negative electrode 100 has a structure in which a negative electrode active material layer 102 is provided over a negative electrode current collector 101. Although the negative electrode active material layers 102 are provided so that the negative electrode current collector 101 is sandwiched therebetween in FIGS. 1A and 1B, the negative electrode active material layer 102 may be formed over only one surface of the negative electrode current collector 101. The negative electrode active material layer 102 includes a negative electrode active material.

The negative electrode current collector 101 can be formed using a material that has high conductivity and is not alloyed with carrier ions such as lithium ions, e.g., a metal typified by gold, platinum, zinc, iron, copper, titanium, tantalum, or manganese, or an alloy thereof (e.g., stainless steel). Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 101 can have a foil-like shape, a plate-like shape (sheet-like shape), a net-like shape, a cylindrical shape, a coil shape, a punching-metal shape, an expanded-metal shape, or the like as appropriate. The negative electrode current collector 101 preferably has a thickness of 5 μm to 30 μm, inclusive, more preferably 8 μm to 10 μm, inclusive. The negative electrode current collector 101 preferably has a thickness greater than or equal to 5 μm and less than or equal to 30 μm, more preferably greater than or equal to 8 μm and less than or equal to 15 μm. Note that, for example, the thickness of the negative electrode current collector 101 is preferably greater than or equal to 5 μm and less than or equal to 30 μm, more preferably greater than or equal to 8 μm and less than or equal to 15 μm over the whole region. Note that one embodiment of the present invention is not limited to these examples. For example, at least part of the negative electrode current collector 101 may have a thickness greater than or equal to 5 μm and less than or equal to 30 μm, preferably greater than or equal to 8 μm and less than or equal to 15 μm. Furthermore, 50% or more of the negative electrode current collector 101 may have a thickness greater than or equal to 5 μm and less than or equal to 30 μm, preferably greater than or equal to 8 μm and less than or equal to 15 μm.

For the negative electrode active material, a metal that is alloyed and dealloyed with carrier Ions to enable charge and discharge reactions to occur can be used. In the case where carrier ions are lithium ions, examples of the metal include Mg, Ca, Al, Si, Ge, Sn, Pb, As, Sb, Bi, Ag, Au, Zn, Cd, and Hg. Such a metal has higher capacity than graphite. In particular, silicon has a significantly high theoretical capacity of 4200 mAh/g. For this reason, silicon is preferably used as the negative electrode active material. Examples of compound materials using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such, as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, as the negative electrode active material, $Li_{3-x}M_xN$ (M=Co, Ni, or Cu) with a $Li_3N$ structure, winch is a nitride containing lithium and a transition metal, can be used. For example, $Li_{2.6}Co_{0.4}N_3$ is preferable because of its high charge and discharge capacity (900 mAh/g).

A nitride containing lithium and a transition metal is preferably used. In which case lithium ions are included in the negative electrode active material, and thus the negative electrode active material can be used in combination with a material for a positive electrode active material that does not include lithium ions, such as $V_2O_5$ or $Cr_3O_8$. In the case of using a material containing lithium ions as a positive electrode active material, the nitride containing lithium and a transition metal can be used for the negative electrode active material by extracting the lithium, ions contained in the positive electrode active material in advance.

In this embodiment, silicon is used as the negative electrode active material. As silicon, amorphous silicon, microcrystalline silicon, polycrystalline silicon, or a combination thereof can be used. In general, silicon with higher crystallinity has higher electric conductivity; therefore, it can be used for an electrode having high conductivity in a power storage device. In the case of amorphous silicon, more carrier ions such as lithium ions can be received than in the case of crystalline silicon; thus, discharge capacity can be increased.

The negative electrode active material layer 102 preferably includes a conductive additive. The conductive additive included in the negative electrode active material layer 102 increases the electronic conductivity of the negative electrode active material layer 102. As the conductive additive, any of a variety of conductive additives such as acetylene black particles, ketjen black particles, carbon nanofibers, and graphene can be used.

The negative electrode active material layer 102 may further include a binder. The binder can increase the adhesion between the negative electrode active material and the conductive additive or the like, and the adhesion between the negative electrode active material and the current collector. As the binder, polyvinylidene fluoride (PVDF) as a typical one, polyimide, polytetrafluoroethylene, polyvinyl chloride, an ethylene-propylene-diene polymer, butadiene rubber, styrene-butadiene rubber, butyl rubber, acrylonitrile-butadiene rubber, fluorine rubber, polyvinyl acetate, polymethyl methacrylate, polyethylene, polypropylene, nitrocellulose, or the like can be used. In particular, when silicon or the like whose volume changes markedly by charge and discharge is used as the negative electrode active material, the use of polyimide with an excellent binding property enhances adhesion between the negative electrode active materials, the negative electrode active material and the conductive additive, the negative electrode active material and the current collector, and the conductive additive and the current collector. Thus, separation and pulverization of the negative electrode active material are inhibited, which makes it possible to obtain excellent charge and discharge cycle characteristics.

A negative electrode using silicon as an active material has an extremely low electrode potential and thus has a high reducing ability. For this reason, an electrolytic solution using an organic solvent is reductively decomposed on a surface of silicon during charge and discharge in some cases. The decomposition reaction is an irreversible reaction; therefore, there occurs problems such as reduction in charge and discharge efficiency and reduction in capacity.

Here, the size of silicon particles will be described. The silicon particles with a size larger than that of the conductive additive are difficult to uniformly mix with the conductive additive, so that a favorable conductive path cannot be formed. Thus, the conductive path is lost by expansion and contraction of silicon with charge and discharge, which reduces capacity. Moreover, in the case where the particle size is large, stress to the surfaces of the particles increases because the surface area is small relative to volume increase, and the particles are likely to be cracked, for example. In contrast, the too small size of silicon particles increases the surface areas of the silicon particles, promoting the decomposition reaction of an electrolytic solution. This reduces charge and discharge efficiency, leading to lower capacity. Therefore, the size of silicon particles have certain optimum values. For example, the size of silicon particles are preferably greater than or equal to 0.001 μm and less than or equal to 7 μm, more preferably greater than or equal to 0.1 μm and less than or equal to 3 μm, still more preferably greater than or equal to 0.3 μm and less than or equal to 3 μm.

In the case where a power storage device such as a secondary battery is used in a flexible display device, a flexible electronic device, or the like, the power storage device is provided in a flexible portion (part or the whole of a housing). Repeated change in the form of the power storage device by bending it together with the flexible portion might cause separation between a current collector and an active material in the power storage device, so that deterioration of the power storage device might be promoted. The size of silicon particles are set to optimum values and silicon particles and the conductive additive are uniformly mixed, whereby a favorable conductive path can be formed and retained even after the repeated change in the form of the power storage device.

Furthermore, increasing the conductivity of silicon by adding an impurity can reduce the unevenness of a battery reaction in an electrode. Examples of an impurity to be added include impurities that impart n-type conductivity such as phosphorus (P) and arsenic (As) and impurities that impart p-type conductivity such as boron (B), aluminum (Al), and gallium (Ga). For example, the resistivity of silicon is preferably higher than or equal to $10^{-4}$ Ω·cm and lower than or equal to 50 Ω·cm, more preferably higher than or equal to $10^{-3}$ Ω·cm and lower than or equal to 20 Ω·cm. An example of an uneven reaction is as follows: the charge and discharge depth locally increases, which causes lithium deposition. When the deposited lithium is dissolved again and cannot be ionized, capacity is decreased.

The aforementioned negative electrode can be used for the power storage device of one embodiment of the present invention.

[Fabricating Method of Negative Electrode Structure 1]

Silicon is used as the active material in this embodiment.

Silicon particles with a size in the above range can be obtained by grinding silicon not in the form of particles (e.g., silicon wafer), for example. Alternatively, silicon particles with a large size may be ground to obtain silicon particles with a desired size. Examples of grinding methods include grinding using a mortar and grinding using a ball mill. For another example, after grinding using a mortar, grinding using a ball mill may be performed. Here, the case of treatment with a ball mill will be described as an example. Compounds are weighed and added to a solvent, the mixture is rotated with the use of metallic balls or ceramic balls. With ball mill treatment, the compounds can be mixed and formed into minute particles, so that the electrode material that is to be formed can be minute particles. Furthermore, with the ball mill treatment, the compounds as raw materials can be mixed uniformly.

The conductive additive, the negative electrode active material particles, and the binder are added to and mixed with the solvent. The mixing ratio of them is appropriately adjusted in accordance with desired battery properties.

As the solvent, a liquid in which a raw material is not dissolved but dispersed can be used. Furthermore, the solvent is preferably a polar solvent. For example, one of water, methanol, ethanol, acetone, tetrahydrofuran (THF), dimethylformamide (DMF), N-methyl-2-pyrrolidone (NMP), and dimethyl sulfoxide (DMSO) or a mixed solution of two or more of the polar solvents can be used.

As the binder, a binder with high heat resistance, such as polyimide, is used. Note that a substance mixed in the mixing step is a precursor of polyimide, and the precursor of polyimide is imidized in a heating step performed later to be polyimide.

To mix the compounds, a mixer is used, for example. The binder, the active material, and the solvent are mixed and stirred in a mixer to form slurry (mixture).

Next, the slurry is applied to the negative electrode current collector 101, and the negative electrode current collector to which the slurry is applied is dried to remove the solvent. The drying step is performed at room temperature in a dry atmosphere, for example. Note that in the case where the solvent can be removed in the heating step performed later, the drying step is not necessarily performed.

Next, the negative electrode current collector to which the slurry is applied is heated. The heating temperature is higher than or equal to 200° C. and lower than or equal to 400° C., preferably approximately 300° C. The heating temperature is kept for more than or equal to 1 hour and less than or equal to 2 hours, preferably approximately 1 hour. Through the heating step, the slurry is baked and thus the precursor of polyimide is imidized to be polyimide In this embodiment, the heating step for baking the slurry is performed at a temperature at which the binder is not decomposed, for example, higher than or equal to 200° C. and lower than or equal to 400° C., preferably 300° C. This makes it possible to prevent decomposition of the binder and a decrease in the reliability of the power storage device.

Through the above-described fabrication steps, the negative electrode 100 in which the negative electrode active material layer 102 is provided over the negative electrode current collector 101 can be fabricated.

[Negative Electrode Structure 2]

Described next will be a negative electrode of a power storage device that includes a negative electrode current collector and a negative electrode active material layer that contains alloy-based material particles, graphene, and a binder and that is provided over the negative electrode current collector.

Graphene serves as a conductive additive that forms an electron conducting path between an active material and a current collector. Note that graphene in tins specification includes single-layer graphene and multilayer graphene including two to hundred layers. Single-layer graphene refers to a one-atom-thick sheet of carbon molecules having π bonds. When graphene oxide is reduced to form graphene, oxygen contained in the graphene oxide is not entirely released and part of the oxygen remains in the graphene. When the graphene contains oxygen, the proportion of the oxygen measured by X-ray photoelectron spectroscopy (XPS) is higher than or equal to 2 at. % and lower than or equal to 20 at. % of the whole graphene, preferably higher than or equal to 3 at. % and lower than or equal to 15 at. % of the whole graphene. Note that graphene oxide refers to a compound formed by oxidizing the graphene.

The binder can be formed using any of the materials of the binder described above. In particular, when silicon or the like whose volume changes markedly by charge and discharge is used as the alloy-based material particles serving as the negative electrode active material, the use of polyimide with an excellent binding property enhances adhesion between the alloy-based material particles, the alloy-based material particles and graphene, between the alloy-based material particles and the current collector, and between graphene and the current collector. Thus, separation and pulverization of the alloy-based material are inhibited, which makes it possible to obtain excellent charge and discharge cycle characteristics.

With the use of the negative electrode active material layer containing the alloy-based material particles, graphene, and the binder as described above, a graphene flake and part of the alloy-based material particles have a surface contact so that the sheet surrounds the particles, and graphene flakes also have surface contact to overlap with each other; thus, an extensive network of three-dimensional electron conducting paths is established in the negative electrode active material layer. For this reason, it is possible to form a negative electrode active material layer with higher electron conductivity than a negative electrode active material layer containing acetylene black (AB) particles or ketjen black (KB) particles, which are conventionally used as a conductive additive and have an electrical point contact with a negative electrode active material.

Graphene flakes are bonded to each other to form net-like graphene (hereinafter referred to as a graphene net). The graphene net covering the negative electrode active material can function as a binder for binding particles. Thus, the amount of the binder can be reduced, or the hinder does not have to be used. This can increase the proportion of the active material in the electrode volume or weight. That is to say, the capacity of the power storage device can be increased.

Figure 2A:
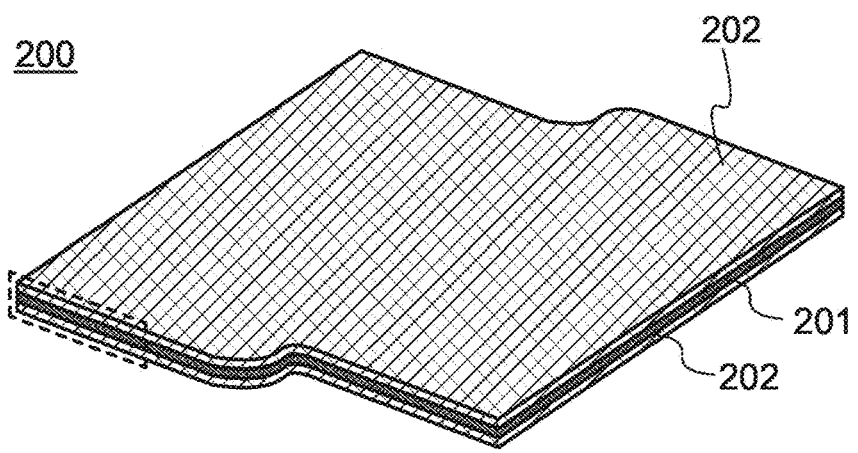
FIGS. 2A to 2D illustrate a negative electrode.
Figure 2B:
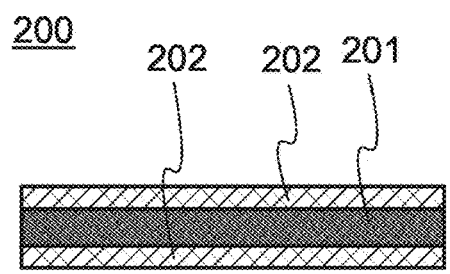

FIG. 2A is an overhead view of a negative electrode, and FIG. 2B is a cross-sectional view of a portion surrounded by a broken line in FIG. 2A. A negative electrode 200 has a structure in which a negative electrode active material layer 202 is provided over a negative electrode current collector 201. Although the negative electrode active material layers 202 are provided so that the negative electrode current collector 201 is sandwiched therebetween in FIGS. 2A and 2B, the negative electrode active material layer 202 may be formed over only one surface of the negative electrode current collector 201.

The negative electrode current collector 201 can be the same as the negative electrode current collector 101.

Figure 2C:
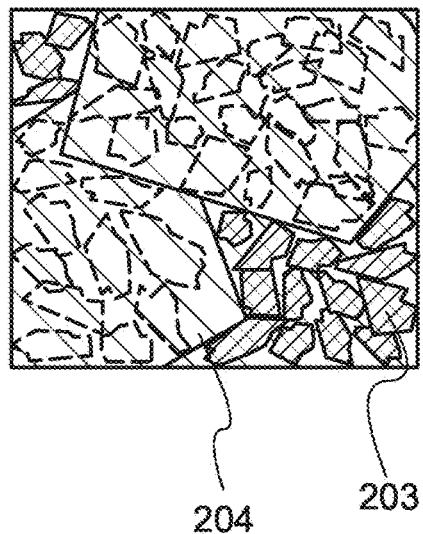

FIG. 2C is a top view of the negative electrode active material layer 202 including negative electrode active material particles 203, graphene flakes 204 that cover a plurality of the negative electrode active material particles 203, and a binder (not illustrated). Different graphene flakes 204 cover surfaces of a plurality of the negative electrode active material particles 203. The negative electrode active material particles 203 may partly be exposed.

The graphene flake 204 is a thin film having a thickness corresponding to the thickness of a single layer or a multilayer of carbon molecules. A plurality of the graphene flakes 204 is formed in such a way as to wrap, coat, or adhere to surfaces of a plurality of the negative electrode active material particles 203, so that the plurality of the graphene flakes 204 make surface contact with the plurality of the negative electrode active material particles 203. Furthermore, the graphene flakes 204 are also in surface contact with each other; consequently, the plurality of the graphene flakes 204 forms a three-dimensional electrical conduction network.

This is because the graphene oxide with extremely high dispersibility in a polar solvent are used for the formation of the graphene flakes 204 as described below. The solvent is removed by volatilization from a dispersion medium in which graphene oxide is uniformly dispersed, and the graphene oxide is reduced to form graphene; hence, the graphene flakes 204 remaining in the negative electrode active material layer 202 partly overlap with each other and are dispersed such that surface contact is made, thereby forming an electrical conduction path.

Unlike a conventional conductive additive in the form of particles, such as acetylene black, which makes point contact with an active material, the graphene flake 204 is capable of surface contact with low contact resistance; accordingly, the electrical conduction between the negative electrode active material particles 203 and the graphene flake 204 can be improved without an increase in the amount of conductive additive. Thus, the proportion of the negative electrode active material particles 203 in the negative electrode active material layer 202 can be increased. Consequently, the capacity of the power storage device can be increased. The weight of the graphene 204 used for the negative electrode active material layer 202 is preferably less than or equal to 30%, more preferably less than or equal to 15%, still more preferably less than or equal to 3% of that of the negative electrode active material parades 203. Note that the weight of graphene obtained by reducing graphene oxide is approximately half that of the graphene oxide.

As described above, the negative electrode active material layer 202 includes graphene as the conductive additive to improve the characteristics of an electron conducting path in the negative electrode active material layer 202, and in addition to graphene, the negative electrode active material layer 202 may include various conductive additives, for example, carbon particles such as acetylene black particles, ketjen black particles, and carbon nanofibers.

As the negative electrode active material particles 203, silicon is used. As silicon, amorphous silicon, microcrystalline silicon, polycrystalline silicon, or a combination thereof can be used. In general, silicon with higher crystallinity has higher electric conductivity; therefore, it can be used for an electrode having high conductivity in a power storage device. In the case of amorphous silicon, more carrier ions such as lithium ions can be received than in the case of crystalline silicon; thus, discharge capacity can be increased.

Figure 2D:
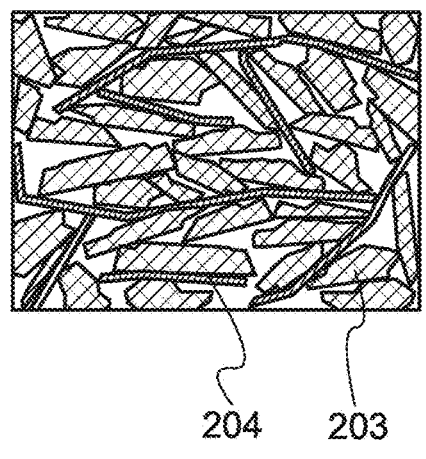

FIG. 2D is a cross-sectional view of part of the negative electrode active material layer 202. The negative electrode active material layer 202 includes the negative electrode active material particles 203 and the graphene flakes 204 covering part of the negative electrode active material particles 203, The graphene flakes 204 are observed to have linear shapes in the cross-sectional view. A plurality of the negative electrode active material particles 203 are at least partly surrounded with one graphene flake 204 or a plurality of graphene flakes 204 or sandwiched between a plurality of graphene flakes 204. Note that the graphene flake 204 has a bag-like shape, and a plurality of the negative electrode active material particles 203 are at least partly surrounded with the graphene flake 204 in some cases. In addition, the negative electrode active material particles 203 are partly not covered with the graphene flake 204 and exposed in some cases.

The graphene flakes 204 form a three-dimensional network. The graphene network has a function of holding the negative electrode active material 203 capable of receiving and releasing carrier ions as well as a function as a conductive additive. That is, the graphene flakes 204 also serves as a binder. Thus, the amount of the binder can be reduced. This can increase the proportion of the negative electrode active material in the negative electrode active material layer 202, leading to higher discharge capacity of the power storage device.

In the negative electrode active material particle 203 whose volume is increased by reception of carrier ions, the negative electrode active material layer 202 gets friable by charge and discharge, and thus the negative electrode active material layer 202 might be partly broken. The negative electrode active material layer 202 that is partly broken decreases the reliability of the power storage device. However, the graphene flake 204 covering the periphery of the negative electrode active material particles 203 can prevent dispersion of the negative electrode active material particles 203 and the collapse of the negative electrode active material layer 202, even when the volume of the negative electrode active material particles 203 is increased and decreased by charge and discharge. In other words, the graphene flake 204 has a function of keeping the bond between the negative electrode active material panicles 203 even when the volume of the negative electrode active material particles 203 is increased and decreased by charge and discharge.

In the case where a power storage device such as a secondary battery is used in a flexible display device, a flexible electronic device, or the like, the power storage device is provided in a flexible portion (part or the whole of a housing). In this case, the power storage device is bent with the flexible portion, so that repeated change in the form of the power storage device might cause separation between a current collector and an active material in the power storage device. As a result, deterioration of the power storage device might be promoted.

The graphene flakes are also in surface contact with each other; consequently, the plurality of graphene flakes form a three-dimensional network for electronic conduction. The graphene network is less likely to be broken by deformation (e.g., bending) because graphene has flexibility and high strength. Thus, a favorable conductive path can be maintained even after repeated deformation. Particularly in the case where a graphene flake has a bag-like shape and the active material is at least partly surrounded with the graphene flake, separation of the active material due to bending hardly occurs and thus the electrode layer is less likely to be collapsed.

Here, the size of silicon particles will be described. In the case where the size of silicon particles are large, a conductive additive and silicon particles are insufficiently dispersed, so that a conductive path is lost by expansion and contraction of silicon with charge and discharge and capacity is reduced. However, the too small size of silicon particles increases the surface areas of the silicon particles, promoting the decomposition reaction of an electrolytic solution. This reduces charge and discharge efficiency, leading to lower capacity. Therefore, the size of silicon particles have certain optimum values. For example, the size of silicon particles are preferably greater than or equal to 0.001 μm and less than or equal to 7 μm, more preferably greater than or equal to 0.1 μm and less than or equal to 3 μm, still more preferably greater than or equal to 0.3 μm and less than or equal to 3 μm.

Furthermore, increasing the conductivity of silicon by adding an impurity can reduce the unevenness of a battery reaction in an electrode. Examples of an impurity to be added include impurities that impart n-type conductivity such as phosphorus (P) and arsenic (As) and impurities that impart p-type conductivity such as boron (B), aluminum (Al), and gallium (Ga). For example, the resistivity of silicon is preferably higher than or equal to $10^{-4}$ Ω·cm and lower than or equal to 50 Ω·cm, more preferably higher than or equal to $10^{-3}$ Ω·cm and lower than or equal to 20 Ω·cm. An example of an uneven reaction is as follows: the charge and discharge depth locally increases, which causes lithium deposition. When the deposited lithium is dissolved again and cannot be ionized, capacity is decreased.

The aforementioned negative electrode can be used for the power storage device of one embodiment of the present invention.

[Fabricating Method of Negative Electrode Structure 2]

The negative electrode active material layer 202 in the negative electrode 200 of one embodiment of the present invention includes the graphene flakes 204 as described above. Graphene can be obtained, for example, by mixing graphene oxide as a raw material of graphene, a negative electrode active material, and a binder and then thermally reducing the mixture. An example of a method for fabricating such a negative electrode will be described below.

First, graphene oxide as a raw material of graphene is formed. Graphene oxide can be formed by various synthesis methods such as a Hummers method, a modified Hummers method, and oxidation of graphite.

For example, in a Hummers method, graphite such as flake graphite is oxidized to give graphite oxide. The obtained graphite oxide is graphite that is oxidized in places and thus to which a functional group such as a carbonyl group, a carboxyl group, or a hydroxyl group is bonded. In the graphite oxide, the crystallinity of the graphite is lost and the distance between layers is increased. Therefore, graphene oxide can be easily obtained by separation of the layers from each other by ultrasonic treatment or the like. Note that the length of one side (also referred to as a flake size) of graphene oxide that is formed is preferably several micrometers to several tens of micrometers.

Next, graphene oxide obtained by the above-described method or the like, the negative electrode active material particles, and the binder are added to and mixed with a solvent. The mixing ratio thereof is adjusted appropriately depending on the desired battery characteristics. For example, the ratio of the negative electrode active material particles to graphene oxide and the binder can be 80:5:15 (wt %).

As the solvent, a liquid in which a raw material is not dissolved but dispersed can be used. Furthermore, the solvent is preferably a polar solvent. For example, one of water, methanol, ethanol, acetone, tetrahydrofuran (THF), dimethylformamide (DMF), N-methyl-2-pyrrolidone (NMP), and dimethyl sulfoxide (DMSO) or a mixed solution of two or more of the polar solvents can be used.

As the binder, a binder with high heat resistance, such as polyimide, is used. Note that a substance mixed in the mixing step is a precursor of polyimide, and the precursor of polyimide is imidized in a heating step performed later to be polyimide.

In this embodiment, silicon is used as the negative electrode active material particles. Silicon particles with a desired size can be obtained by grinding silicon not in the form of particles (e.g., silicon wafer), for example. Alternatively, silicon particles with a large size may be ground to obtain silicon particles with a desired size. Examples of grinding methods include grinding using a mortar and grinding using a ball mill. For another example, after grinding using a mortar, grinding using a ball mill may be performed.

Note that graphene oxide flakes are not easily aggregated in a solution having polarity because the graphene oxide flakes are negatively charged due to functional groups included in the graphene oxide flakes. Thus, the graphene oxide flakes are uniformly dispersed in the solution having polarity. Particularly when added to and mixed with the solvent in the initial step of the mixing steps, graphene oxides are more likely to disperse uniformly in the solvent. Consequently, graphene flakes are dispersed uniformly in the negative electrode active material particles, which enables the negative electrode active material particles with high electric conductivity to be formed.

To mix the compounds, a mixer is used, for example. An example of a mixer is a planetary mixer. The binder, the active material, and the solvent are mixed and stirred in a mixer to form slurry (mixture).

Here, there is no particular limitation on the order of adding graphene oxide, the negative electrode active material particles, and the binder to the solvent. For example, the negative electrode active material particles are added to and mixed with the solvent, graphene oxide is added to and mixed with the mixture, and then the binder is added thereto and mixed therewith. To adjust the viscosity of the mixture, the solvent may be additionally added in each of the mixing steps.

An example of the mixing method will be described. First, the solvent is added to the active material and they are mixed in a mixer. For example, NMP is used as the solvent. Then, graphene oxide is added to the mixture and the obtained mixture is kneaded. Here, kneading refers to mixing something in a highly viscous state. The kneading can separate aggregation of the graphene oxide and uniformly disperse the active material and the graphene oxide. The solvent may be added in the kneading. The sum of the amount of the solvent added in the process up to the kneading step is preferably greater than or equal to 0.46 ml and less than or equal to 0.80 ml per gram of the active material. Then, the binder is added to the mixture and they are mixed in a mixer. An example of the binder is polyimide. Another solvent is further added and mixing is performed in a mixer.

Through the above steps, the negative electrode active material particles, graphene oxide, the binder, and the solvent are mixed to form slurry (mixture).

Next, the slurry is applied to the negative electrode current collector 201, and the negative electrode current collector to which the slurry is applied is dried to remove the solvent. The drying step is performed at room temperature in a dry atmosphere, for example. Note that in the case where the solvent can be removed in the heating step performed later, the drying step is not necessarily performed.

Next, the negative electrode current collector to which the slurry is applied is heated, The heating temperature is higher than or equal to 200° C. and lower than or equal to 400° C., preferably approximately 300° C. The heating temperature is kept for more than or equal to 1 hour and less than or equal to 2 hours, preferably approximately 1 hour. Through the heating step, the slurry is baked and thus the precursor of polyimide is imidized to be polyimide. At the same time, graphene oxide is reduced to form graphene. Heating for baking the slurry and heating for reducing graphene oxide can be performed through one heating step as described above; thus, there is no need for performing two heating steps. That is, the number of steps for fabricating the negative electrode can be reduced.

In this embodiment, the heating step for baking the slurry and reducing graphene oxide is performed at a temperature at which the binder is not decomposed, for example, higher than or equal to 200° C. and lower than or equal to 400°p0 C., preferably 300° C. This makes it possible to prevent decomposition of the binder and a decrease in the reliability of the power storage device. Note that the weight of graphene obtained by reducing graphene oxide is approximately half that of the graphene oxide.

In addition, the reduced graphene oxide (i.e., graphene) has low dispersibility because a functional group is released. In the case of using graphene oxide that is reduced before being mixed with an active material and a binder, graphene is not uniformly mixed with the active material and the like; consequently, a power storage device might have poor electrical characteristics. This results from the fact that graphene oxide flakes are negatively charged due to the bond between functional groups containing oxygen and surfaces of graphene oxide flakes and thus are dispersed by occurrence of the repulsion between graphene oxide flakes or the repulsion between graphene oxide flakes and a polar solvent, whereas graphene that is obtained by reducing graphene oxide lose many of functional groups due to the reduction and have low dispersibility accordingly.

In the negative electrode active material layer formed by mixing graphene oxide and an active material and then heating the mixture, graphene is uniformly dispersed in the negative electrode active material layer because graphene oxide is dispersed before functional groups are reduced by the reduction. For this reason, a power storage device with high electric conductivity can be obtained by performing reduction treatment after graphene oxide is dispersed.

Through the above-described fabrication steps, the negative electrode 200 in which the negative electrode active material layer 202 is provided over the negative electrode current collector 201 can be fabricated.

A variety of power storage devices can be fabricated using the above-described negative electrode. Examples of the power storage devices include a battery, a secondary battery, and a lithium-ion secondary battery. In addition, a capacitor is given as another example of the power storage devices. For example, with a combination of the electrode member of one embodiment of the present invention as a negative electrode and an electric double layer positive electrode, a capacitor such as a lithium-ion capacitor can be fabricated.

This embodiment can be implemented in appropriate combination with any of the other embodiments.

(Embodiment 2)

In this embodiment, the structure of a power storage device including the negative electrode fabricated by the fabricating method described in Embodiment 1 will be described with reference to FIGS. 11A to 11C, FIGS. 12A and 12B, FIG. 13, and FIGS. 14A and 14B. Structural examples of power storage devices (storage batteries) will be described with reference to FIGS. 15A and 15B, FIGS. 16A and 16B, FIGS. 17A to 17C, FIGS. 18A to 18C, and FIGS. 19A and 19B. Examples of electrical devices will be described with reference to FIGS. 20A1 to 20B2.

[Coin-type Storage Battery]

Figure 11A:
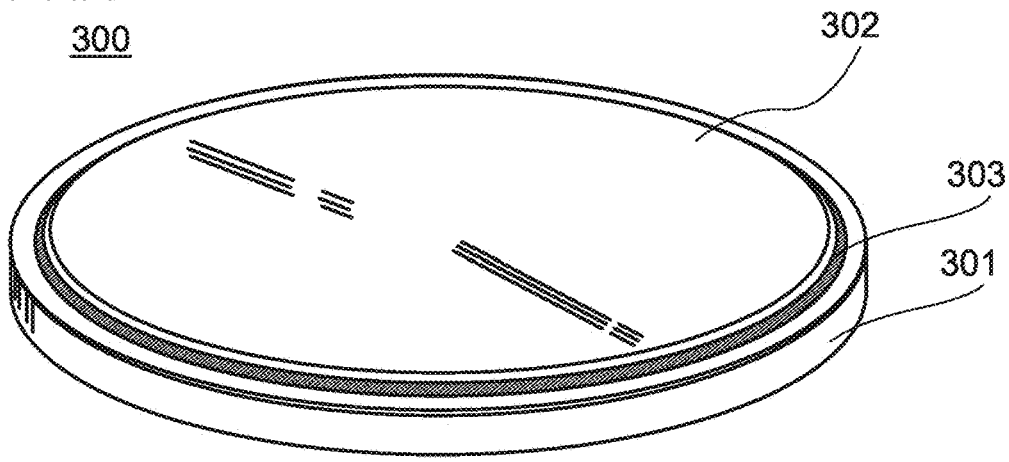
FIGS. 11A to 11C illustrate a coin-type storage battery.
Figure 11B:
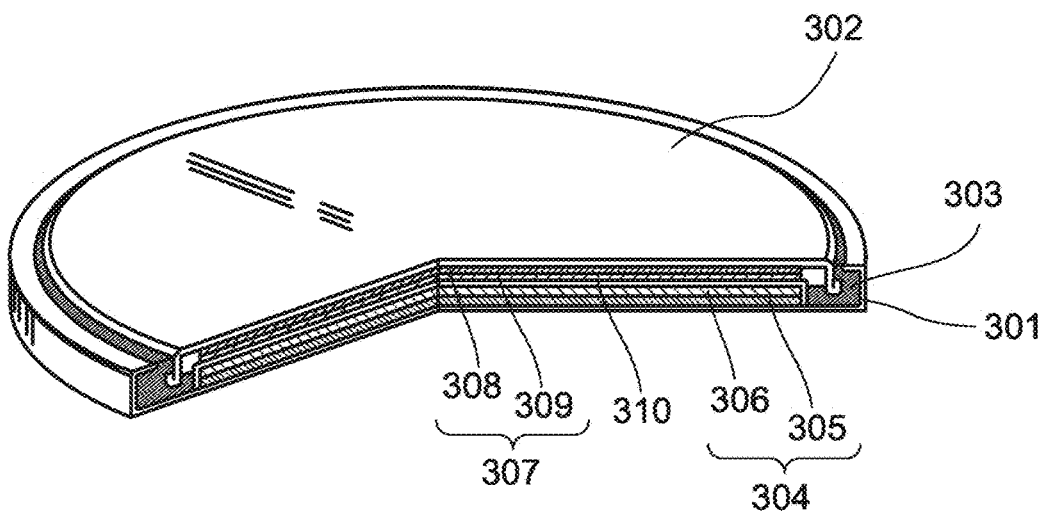

FIG. 11A is an external view of a coin-type (single-layer flat type) storage battery, and FIG. 11B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. Here, the negative electrode for a power storage device that is described in Embodiment 1 is used as a negative electrode 307.

A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode for a power storage device that is described in Embodiment 1 is used as the negative electrode 307.

A separator 310 and an electrolyte (not illustrated) are provided between the positive electrode active material layer 306 and the negative electrode active material layer 309.

As the separator 310, an insulator such as cellulose (paper), polyethylene, and polypropylene with pores can be used.

As an electrolyte of an electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium), an alkaline-earth metal (e.g., calcium, strontium, barium, beryllium, and magnesium) may be used for the supporting electrolyte.

As a solvent of the electrolytic solution, a material with the carrier ion mobility is used. As the solvent of the electrolytic solution, an aprotic organic solvent is preferably used. Typical examples of aprotic organic solvents include EC, propylene carbonate, dimethyl carbonate, DEC, γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like.

Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid is a salt in the liquid state and has high ion mobility (conductivity). An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

An aliphatic quaternary ammonium cation, which has higher reduction resistance, has a particularly excellent effect of inhibiting decomposition of an electrolytic solution with charge and discharge of a power storage device. The use of the aliphatic quaternary ammonium cation leads to suppression of a decrease in the capacity by charge and discharge and favorable cycle characteristics. Furthermore, the capacity of a power storage device can be increased.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 11B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a power storage device will be described with reference to FIG. 11C. When a secondary battery using lithium ions is regarded as a closed circuit, lithium ions transfer and a current flows in the same direction. Note that in the secondary battery using lithium ions, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 11C:
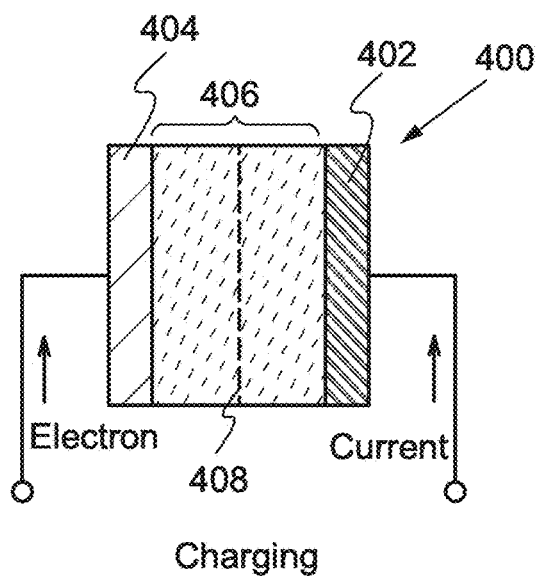

Two terminals in FIG. 11C are connected to a charger, and a storage battery 400 is charged. As the charge of the storage battery 400 proceeds, a potential difference between electrodes increases. The positive direction in FIG. 11C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current.

[Cylindrical Storage Battery]

Figure 12A:
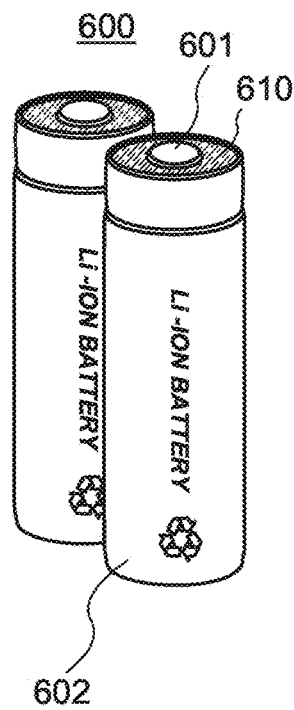
FIGS. 12A and 12B illustrate a cylindrical storage battery.

Next, an example of a cylindrical storage battery will be described with reference to FIGS. 12A and 12B. As illustrated in FIG. 12A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 12B:
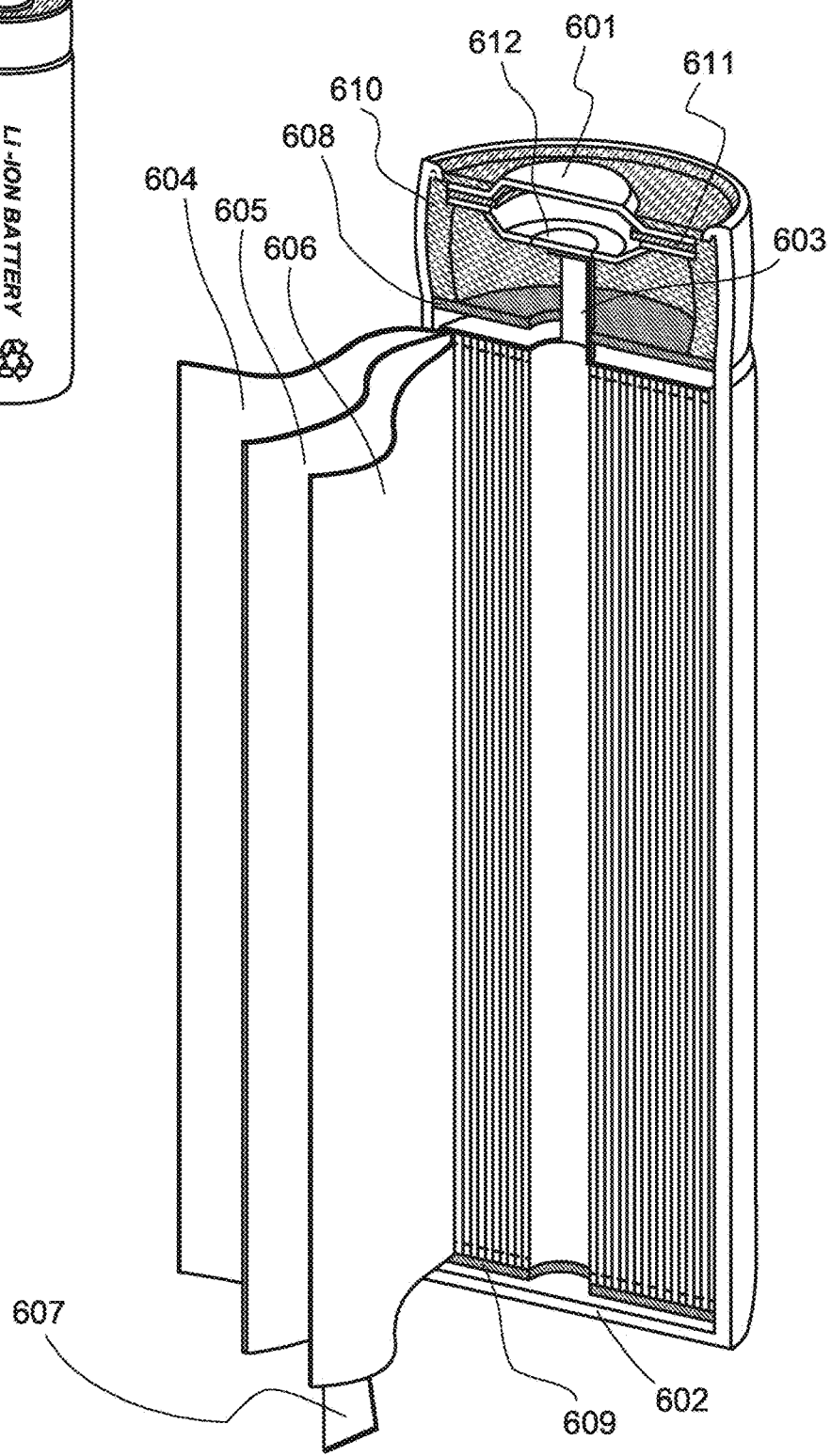

FIG. 12B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The negative electrode for a power storage device that is described in Embodiment 1 is used as the negative electrode 608. Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

[Thin Storage Battery]

Next, an example of a thin storage battery will be described with reference to FIG. 13. When a flexible thin storage battery is used in an electronic device at least part of which is flexible, the storage battery can be bent as the electronic device is bent.

Figure 13:
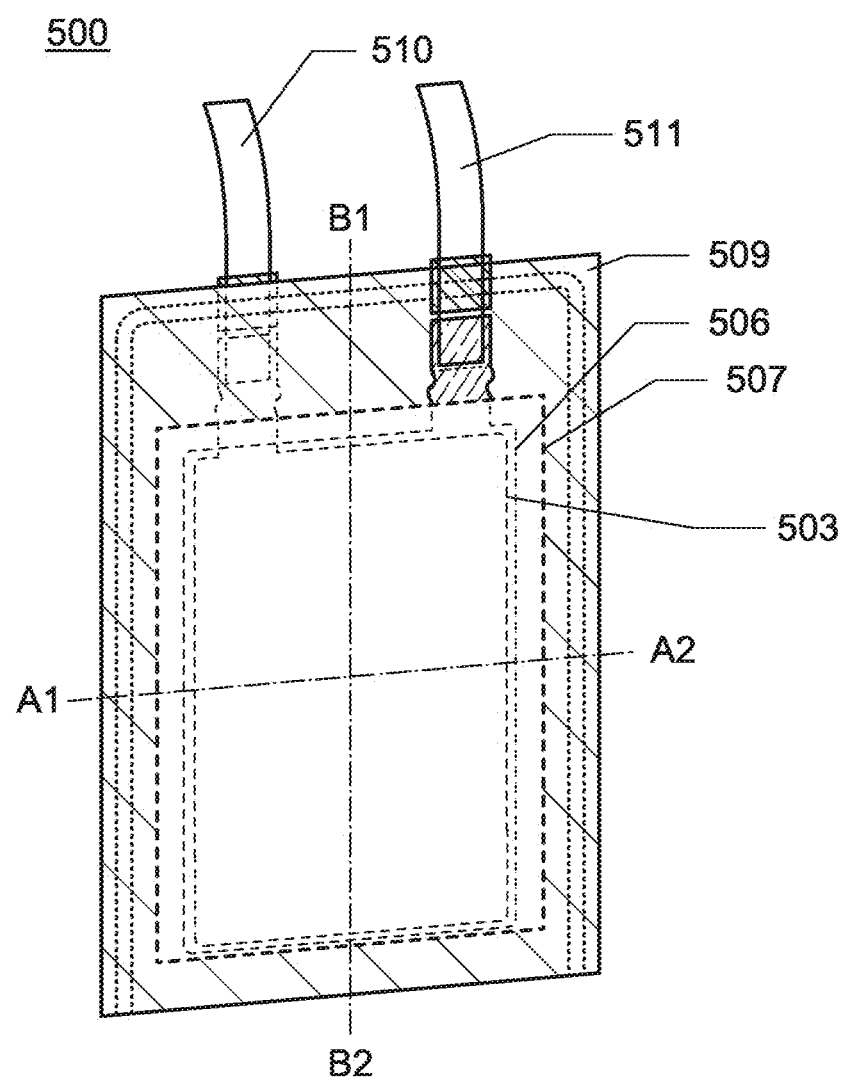
FIG. 13 illustrates a thin storage battery.
Figure 14A:
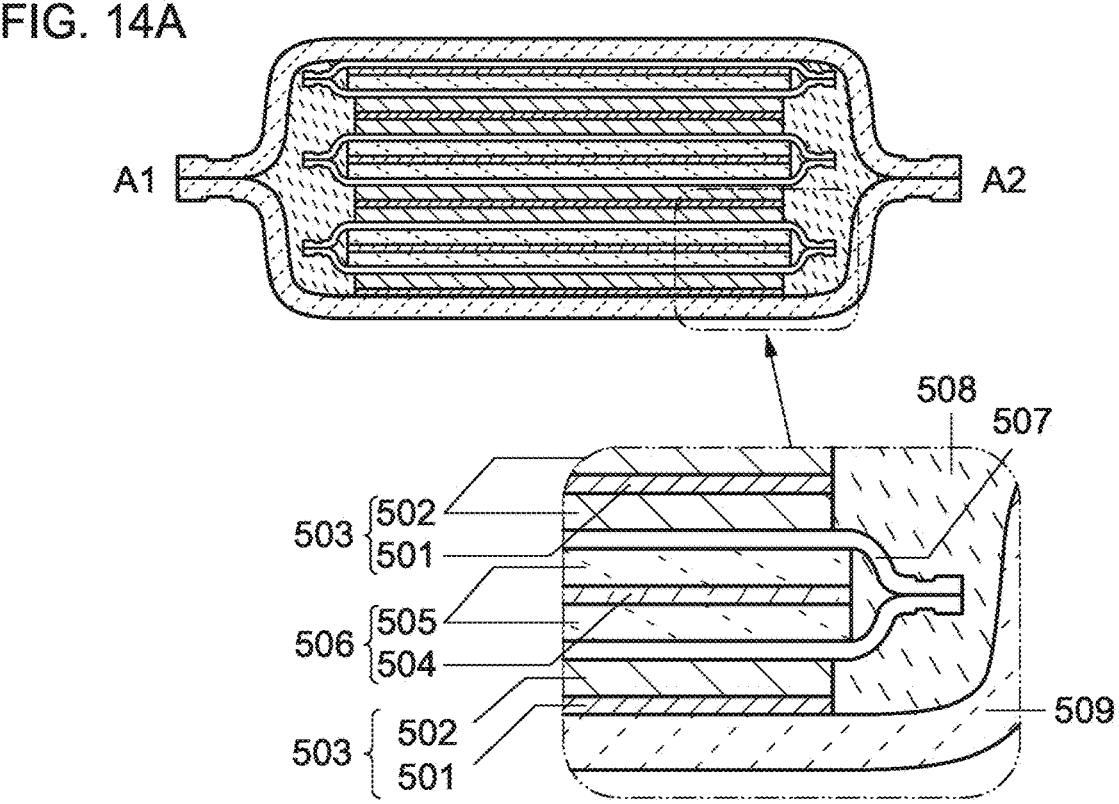
FIGS. 14A and 14B illustrate flexible thin storage batteries.
Figure 14B:
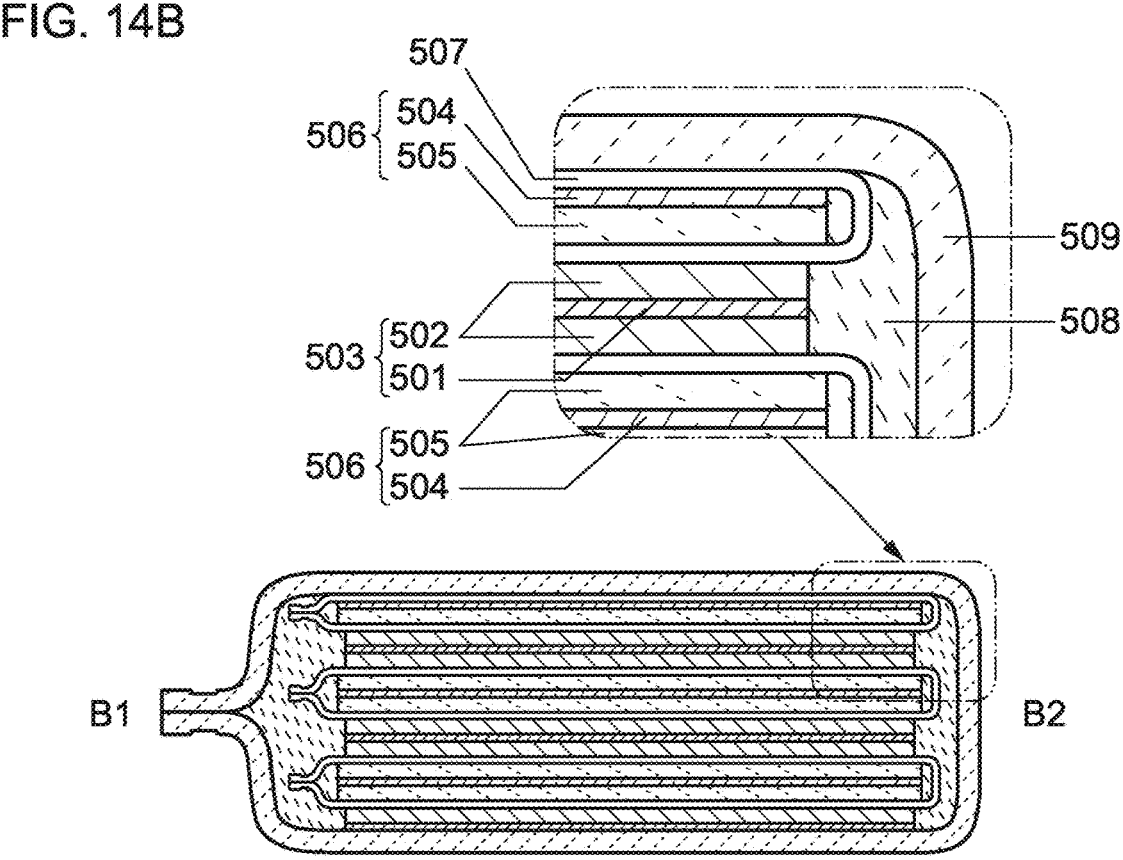

FIG. 13 illustrates the appearance of a thin storage battery 500. FIGS. 14A and 14B are cross-sectional views along dashed dotted lines A1-A2 and B1-B2 in FIG. 13, respectively. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509. The negative electrode for a power storage device that is described in Embodiment 1 is used as the negative electrode 506.

Figure 15A:
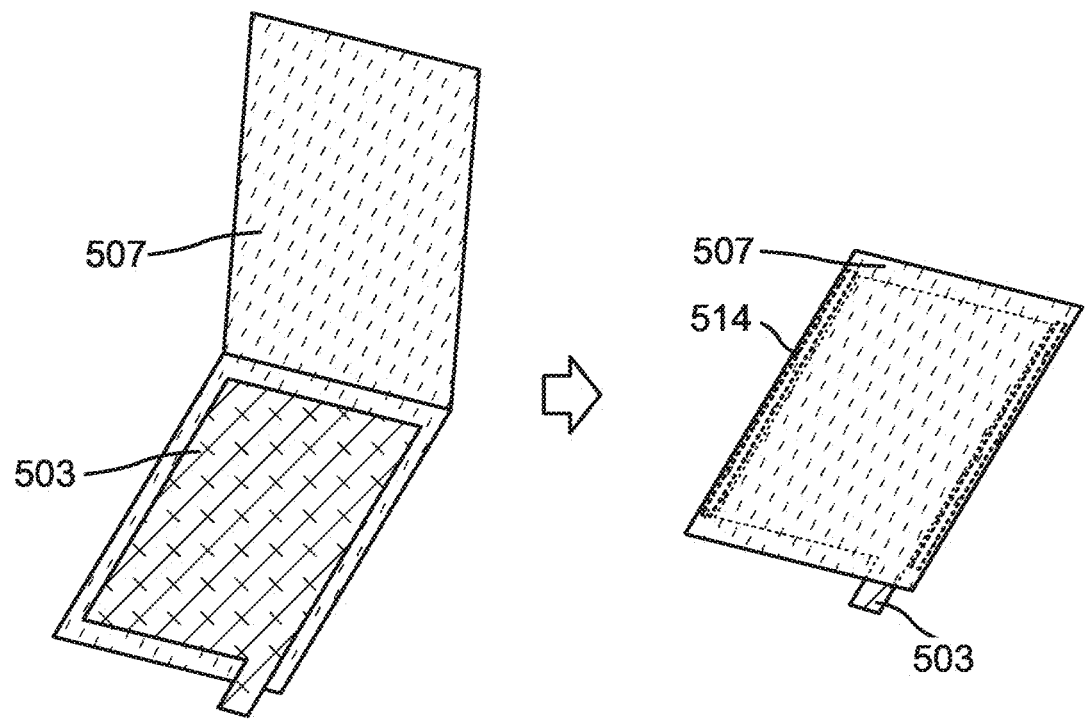
FIGS. 15A and 15B illustrate a thin storage battery.
Figure 15B:
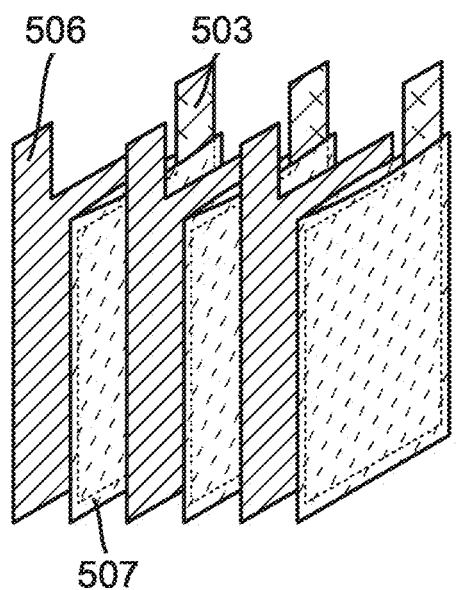

The separator 507 is preferably formed to have a bag-like shape to surround one of the positive electrode 503 and the negative electrode 506. For example, as illustrated in FIG. 15A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 15B, the positive electrodes 503 surrounded by the separators 507 and the negative electrodes 506 are alternately stacked and provided in the exterior body 509, whereby the thin storage battery 500 can be formed.

Figure 16A:
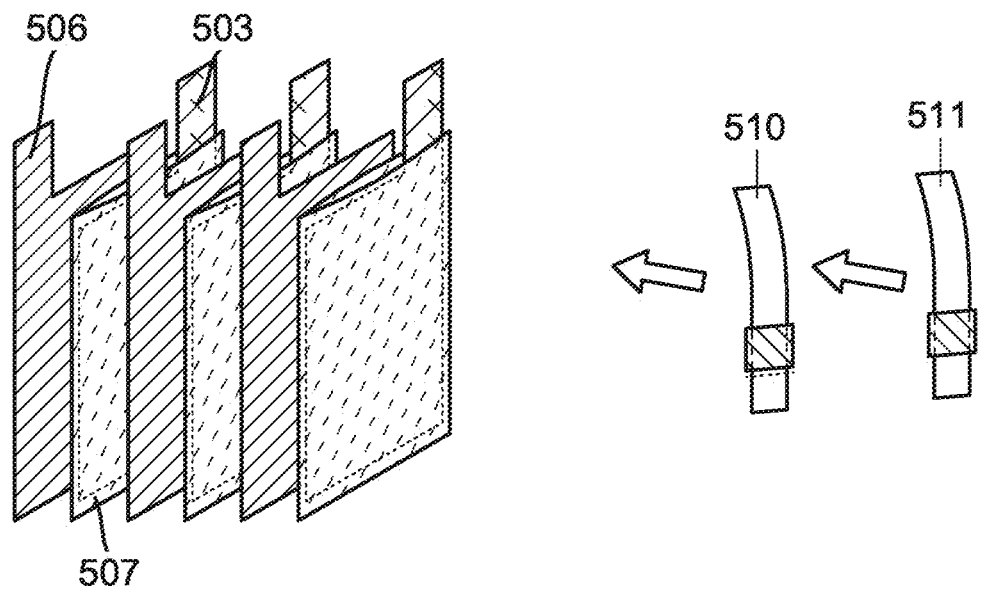
FIGS. 16A and 16B illustrate a thin storage battery.
Figure 16B:
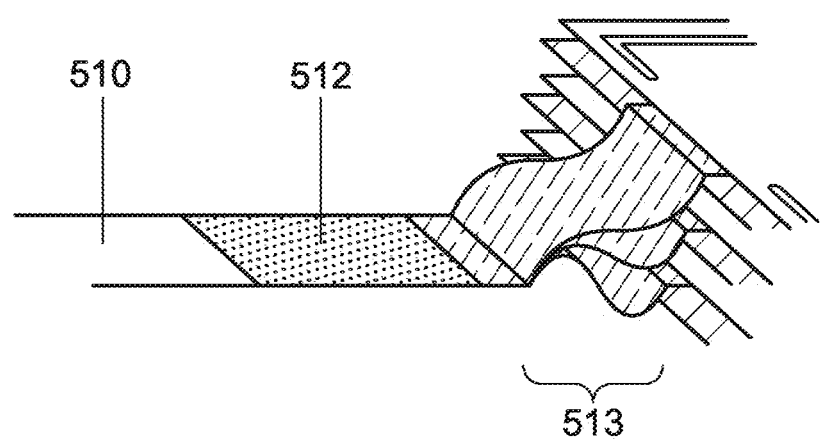

FIG. 16B illustrates an example where a current collector is welded to a lead electrode, specifically, an example where positive electrode current collectors 501 are welded to a positive electrode lead electrode 510. The positive electrode current collectors 501 are welded to the positive electrode lead electrode 510 in a welding region 512 by ultrasonic welding or the lite. The positive electrode current collector 501 includes a bent portion 513 as illustrated in FIG. 16B, and it is therefore possible to relieve stress due to external force applied after fabrication of the storage battery 500. Thus, the storage battery 500 can have high reliability.

In the thin storage battery 500 illustrated in FIG. 13 and FIGS. 14A and 14B, the positive electrode current collectors 501 and the negative electrode current collectors 504 are welded to the positive electrode lead electrode 510 and a negative electrode lead electrode 511, respectively, by ultrasonic welding so that part of the positive electrode lead electrode 510 and part of the negative electrode lead electrode 511 are exposed to the outside. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIG. 13 includes 3 electrode layers. It is needless to say that the number of electrode layers is not limited to 3, and may be more than 3 or less than 3. In the case of using a large number of electrode layers, the storage battery can have high capacity. In contrast, in the case of using a small number of electrode layers, the storage battery can have a small thickness and high flexibility.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

For each of the negative electrodes of the storage batteries 300, 500, and 600, which are described in this embodiment, the negative electrode active material layer of one embodiment of the present invention can be used. Thus, the discharge capacity of the storage batteries 300, 500, and 600 can be increased. Furthermore, it is possible to improve the cycle characteristics of the storage batteries.

Figure 17A:
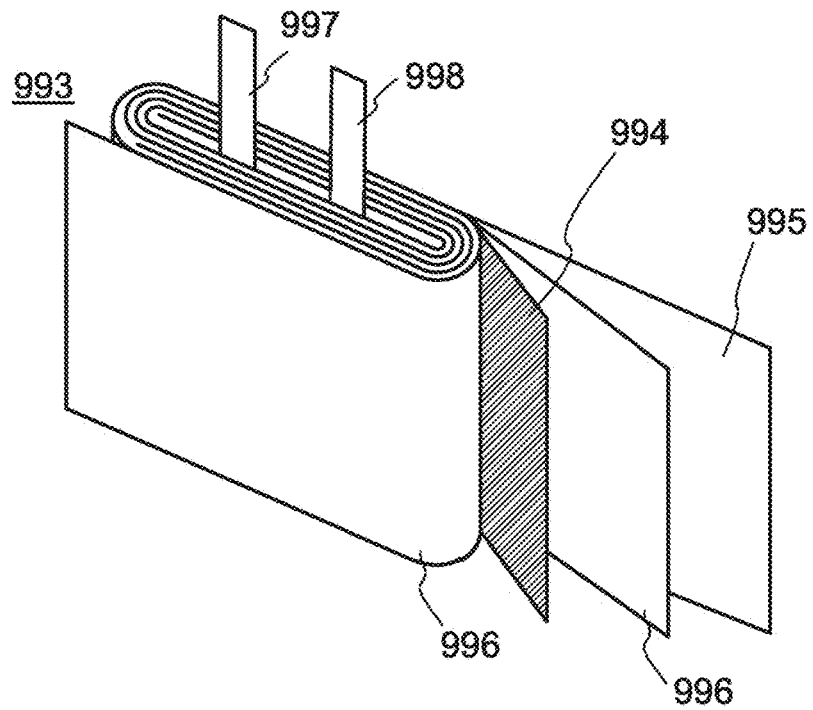
FIGS. 17A to 17C illustrate an example of a power storage device.
Figure 17B:
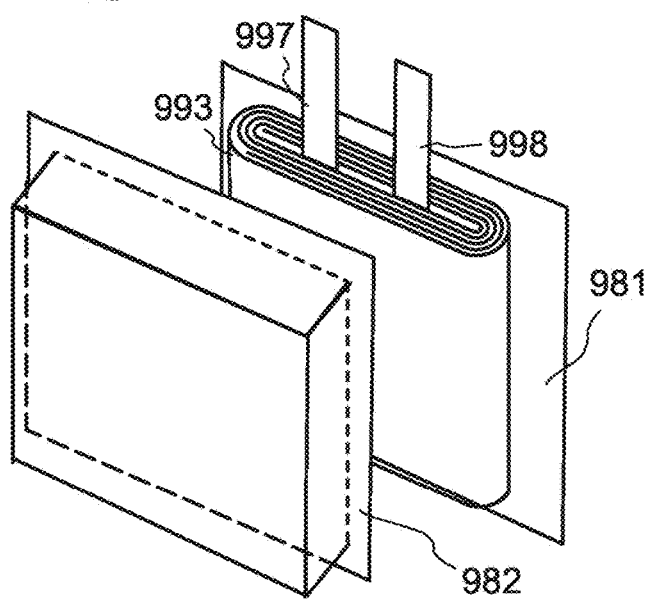
Figure 17C:
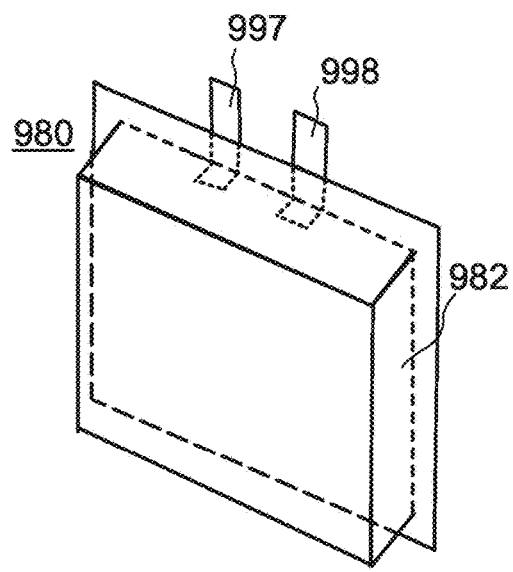

The thin storage battery is not limited to that illustrated in FIG. 13, and other examples of thin storage batteries are illustrated in FIGS. 17A to 17C. A wound body 993 illustrated in FIG. 17A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

In a power storage device 990 illustrated in FIGS. 17B and 17C, the wound body 993 is packed in a space formed by bonding a film 981 and a film 982 having a depressed portion by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 17B and 17C illustrate an example where a space is formed by two films, the wound body 993 may be placed in a space formed by bending one film.

Furthermore, a flexible power storage device in which not only does a thin storage battery have flexibility but also an exterior body and a sealed container have flexibility can be fabricated when a resin material or the like is used for the exterior body and the sealed container. Note that in the case where a resin material is used for the exterior body and the sealed container, a conductive material is used for a portion connected to the outside.

For example, FIGS. 18A to 18C illustrate an example of a flexible rectangular storage battery. The wound body 993 illustrated in FIG. 18A is the same as that illustrated in FIG. 17A, and a detailed description thereof is omitted.

In the power storage device 990 illustrated in FIGS. 18B and 18C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible rectangular storage battery can be fabricated.

Structural examples of power storage devices (power storage units) will be described with reference to FIGS. 19A and 19B, FIGS. 20A1 to 20B2, and FIGS. 21A and 21B.

Figure 19A:
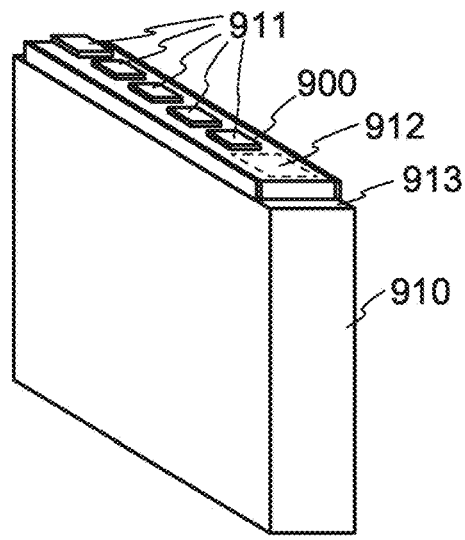
FIGS. 19A and 19B illustrate an example of a power storage device.
Figure 19B:
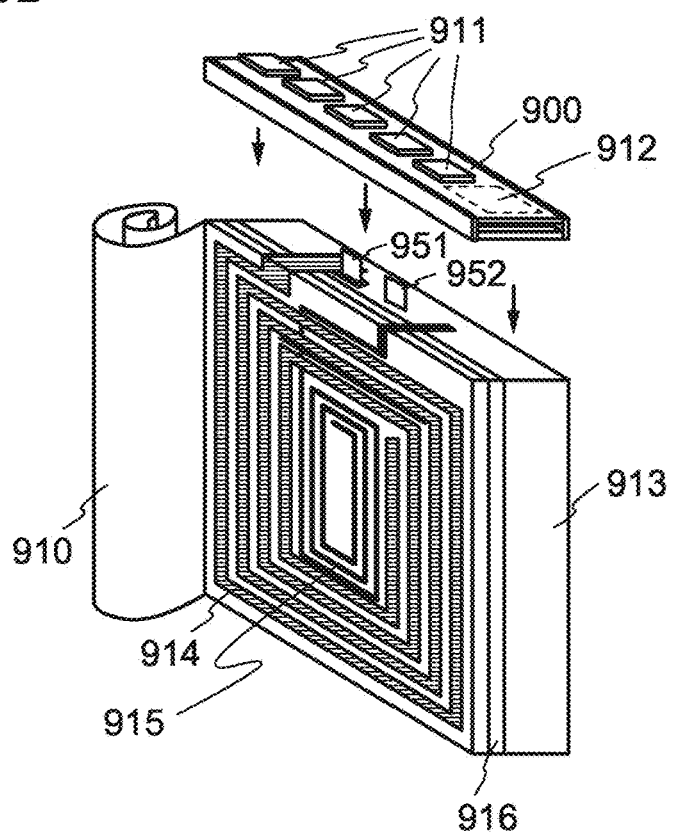

FIGS. 19A and 19B are external views of a power storage device. The power storage device includes a circuit board 900 and a power storage unit 913. A label 910 is attached to the power storage unit 913. As shown in FIG. 19B, the power storage device further includes a terminal 951 and a terminal 952, and includes an antenna 914 and an antenna 915 between the power storage unit 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit beard 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the power storage unit 913 and the antennas 914 and 915. The layer 916 may have a function of preventing an adverse effect on an electromagnetic field by the power storage unit 913. As the layer 916, for example, a magnetic body can be used.

Note that the structure of the power storage device is not limited to that shown in FIGS. 19A and 19B.

For example, as shown in FIGS. 20A1 and 20A2, two opposite surfaces of the power storage unit 913 in FIGS. 19A and 19B may be provided with respective antennas. FIG. 20A1 is an external view showing one side of the opposite surfaces, and FIG. 20A2 is an external view showing the other side of the opposite surfaces. For portions similar to those in FIGS. 19A and 19B, a description of the power storage device illustrated in FIGS. 19A and 19B can be referred to as appropriate.

As illustrated in FIG. 20A1, the antenna 914 is provided on one of the opposite surfaces of the power storage unit 913 with the layer 916 interposed therebetween, and as illustrated in FIG. 20A2, the antenna 915 is provided on the other of the opposite surfaces of the power storage unit 913 with a layer 917 interposed therebetween. The layer 917 may have a function of preventing an adverse effect on an electromagnetic field by the power storage unit 913. As the layer 917, for example, a magnetic body can be used.

With the above structure, both of the antennas 914 and 915 can be increased in size.

Alternatively, as illustrated in FIGS. 20B1 and 20B2, two opposite surfaces of the power storage unit 913 in FIGS. 19A and 19B may be provided with different types of antennas. FIG. 20B1 is an external view showing one side of the opposite surfaces, and FIG. 20B2 is an external view showing the other side of the opposite surfaces. For portions similar to those in FIGS. 19A and 19B, a description of the power storage device illustrated in FIGS. 19A and 19B can be referred to as appropriate.

As illustrated in FIG. 20B1, the antenna 914 is provided on one of the opposite surfaces of the power storage unit 913 with the layer 916 interposed therebetween, and as illustrated in FIG. 20B2, an antenna 918 is provided on the other of the opposite surfaces of the power storage unit 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage device and another device, a response method that can be used between the power storage device and another device, such as NFC, can be employed.

Figure 21A:
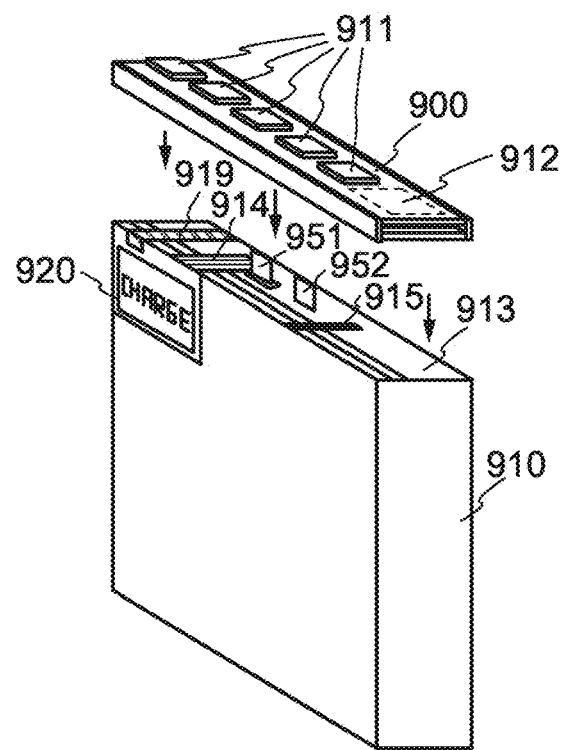
FIGS. 21A and 21B illustrate an example of a power storage device.

Alternatively, as illustrated in FIG. 21A, the power storage unit 913 in FIGS. 19A and 19B may be provided with a display device 920. The display device 920 is electrically connected to the terminal 911 via a terminal 919. It is possible that the label 910 is not provided in a portion where the display device 920 is provided. For portions similar to those in FIGS. 19A and 19B, a description of the power storage device illustrated in FIGS. 19A and 19B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 21B:
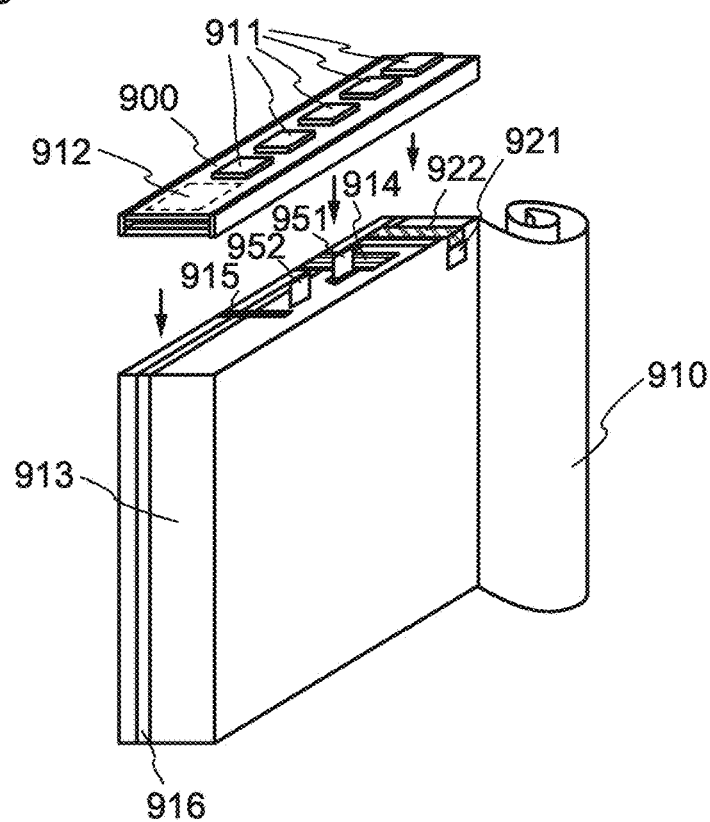

Alternatively, as illustrated in FIG. 21B, the power storage unit 913 illustrated in FIGS. 19A and 19B may be provided with a sensor 921. The sensor 921 is electrically connected to the terminal 911 via a terminal 922. Note that the sensor 921 may be provided between the power storage unit 913 and the label 910. For portions similar to those in FIGS. 19A and 19B, a description of the power storage device illustrated in FIGS. 19A and 19B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage device is placed can be determined and stored in a memory inside the circuit 912.

FIGS. 22A to 22F illustrate examples of electronic devices including the flexible storage batteries described in FIG. 13, FIGS. 17A to 17C, and FIGS. 18A to 18C. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 22A:
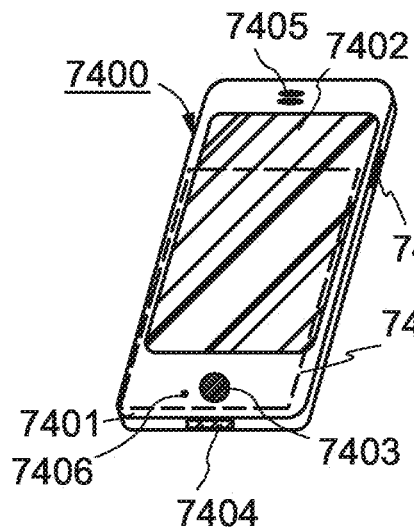
FIGS. 22A to 22F illustrate examples of power storage devices.

FIG. 22A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 22B:
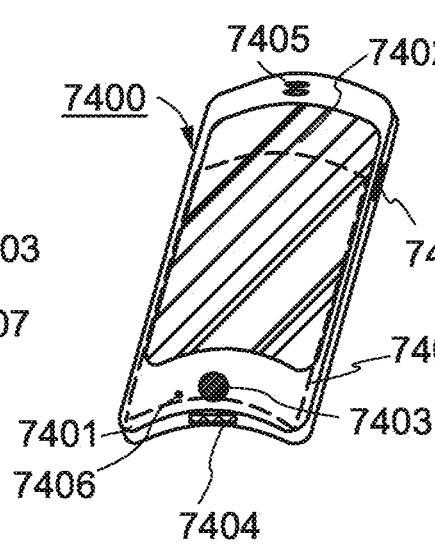
Figure 22C:
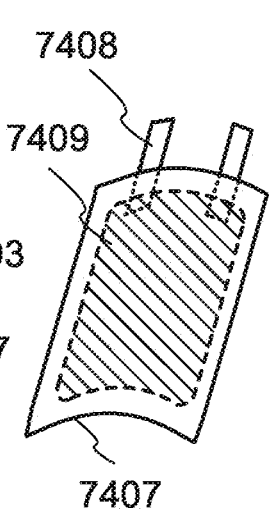

FIG. 22B illustrates the mobile phone 7400 that is bent. When the whole mobile phone 7400 is bent by the external force, the power storage device 7407 included in the mobile phone 7400 is also bent. FIG. 22C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 22D:
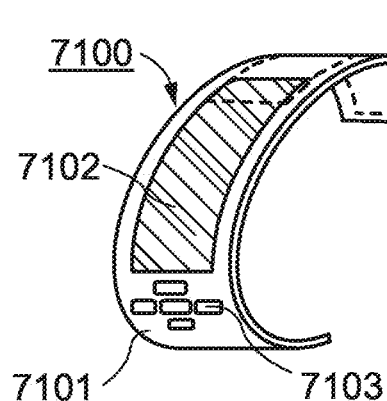
Figure 22E:
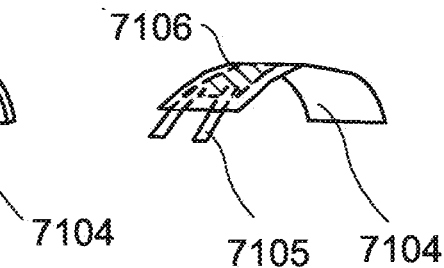

FIG. 22D illustrates an example of a bangle display device. A portable display device 7100 includes a housing 7101, a display portion 7102, an operation button 7103, and a power storage device 7104. FIG. 22E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature R from 40 mm to 150 mm. When the radius of curvature R at the main surface of the power storage device 7104 is greater than or equal to 40 mm and less than or equal to 150 mm, the reliability can be kept high. Note that the power storage device 7104 includes a lead electrode 7105 that is electrically connected to a current collector 7106. The current collector 7106 is, for example, a copper foil, and partly alloyed with gallium; thus, adhesion between the current collector 7106 and an active material layer in contact with the current collector 7106 is improved and the power storage device 7104 can have high reliability even when the power storage device 7104 is bent and its curvature is changed many times.

Figure 22F:
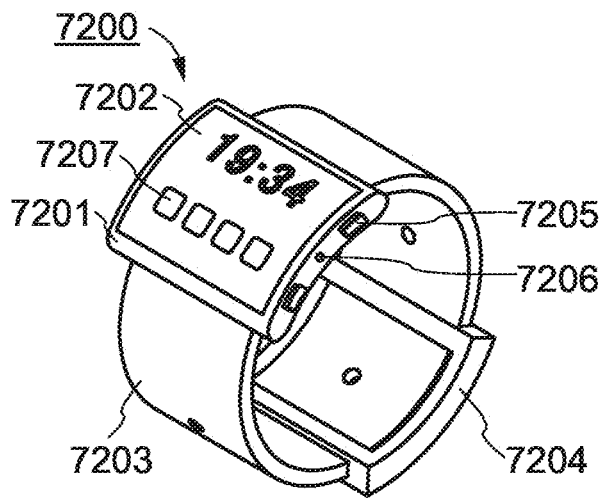

FIG. 22F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as power on/off, on/off of wireless communication, setting and cancellation of a manner mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication, can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 22E that is in the state of being curved can be provided in the housing 7201. Alternatively, the power storage device 7104 illustrated in FIG. 22E can be provided in the band 7203 such that it can be curved.

EXAMPLES OF ELECTRICAL DEVICES: VEHICLES

Next, examples where a storage battery is used in a vehicle will be described. The use of storage batteries in vehicles enables production of next-generation clean energy vehicles such as hybrid electric vehicles (HEVs)s electric vehicles (EVs), and plug-in hybrid electric vehicles (PHEVs).

Figure 23A:
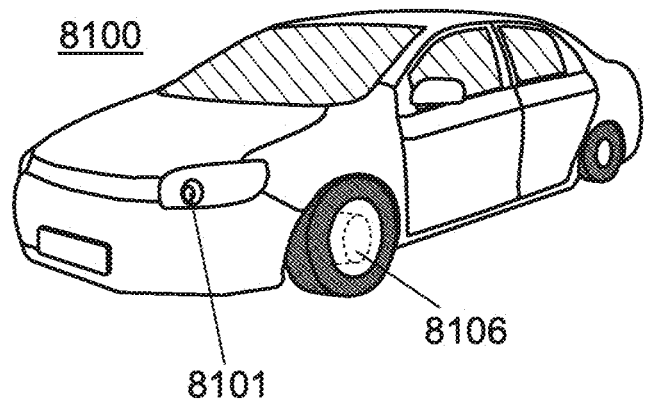
FIGS. 23A and 23B illustrate application examples of a power storage device.
Figure 23B:
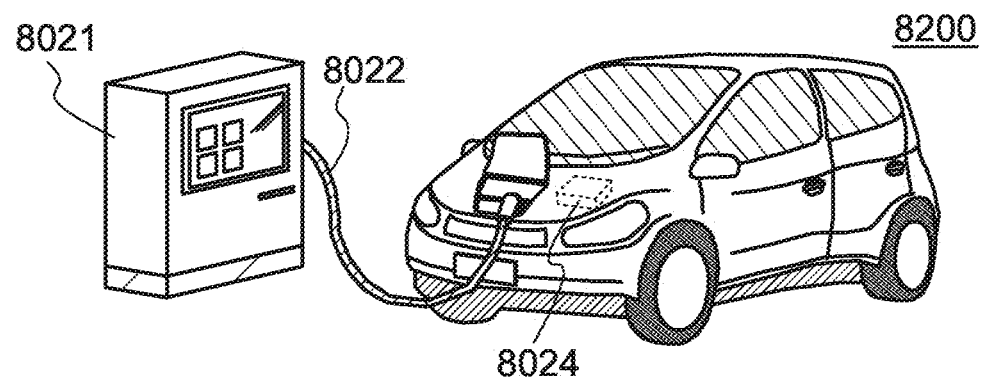

FIGS. 23A and 23B each illustrate an example of a vehicle using one embodiment of the present invention. An automobile 8100 illustrated in FIG. 23A is an electric vehicle that runs on the power of an electric motor 8106. Alternatively, the automobile 8100 is a hybrid electric vehicle capable of driving appropriately using either the electric motor 8106 or the engine. One embodiment of the present invention can provide a high-mileage vehicle. The automobile 8100 includes the power storage device. The power storage device is used not only for driving the electric motor 8106, but also for supplying electric power to a light-emitting device such as a headlight 8101 or a room light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

FIG. 23A illustrates an automobile 8100 including the power storage device. The automobile 8100 can be charged when the power storage device is supplied with electric power through external charging equipment by a plug-in system, a contactless power feeding system, or the like. In FIG. 23B, the power storage device included in the automobile 8100 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8100 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of unproved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Example 1

In this example, half cells were fabricated using the negative electrode described in Embodiment 1 and measurement of the half cells was performed.

(Grinding of Silicon)

Silicon wafers were ground. Table 1 shows samples of the ground silicon as Samples A to H and Comparative Sample I. The silicon wafers used had n-type conductivity/p-type conductivity and resistivities shown in Table 1. The plane directions of the silicon wafers in Table 1 are all the (100) plane. First, each of the silicon wafers was cut into 6-cm squares and ground in a mortar. After that, grinding was further performed in a ball mill with a ball diameter of 3 mm under the conditions of RPM and treatment time that are shown in Table 1. Balls and the silicon ground in a mortar were put in a 54-ml ball mill. The weight of the balls is 22 g, and the weights of silicon are as follows: Samples A, E, H: 2 g; Samples B, C, D, F, G: 4 g; and Comparative Sample I: 8 g. Acetone was used as a solvent. The size of the obtained silicon particle was measured using a laser diffraction particle size analyzer (SALD-2200 manufactured by Shimadzu Corporation). A laser diffraction and scattering method was used as a method for calculating the particle size. Table 1 shows the average particle sizes and the values of D90 (the particle size when the integrated amount of particle size distribution in the accumulated particle curve obtained as a result of particle size measurement is 90%).

TABLE 1

|  | Conductivity | Resistivity (Ω · cm) nominal value | Ball mill condition | Average particle size (μm) | D90 (μm) |
|---|---|---|---|---|---|
| Sample A | p-type | 0.01~0.02 | 400 rpm 12 hr. | 0.487 | 0.815 |
| Sample B | p-type | 8~12 | 400 rpm 5 hr. | 0.767 | 2.098 |
| Sample C | n-type | 8~12 | 400 rpm 5 hr. | 0.787 | 2.366 |
| Sample D | n-type | 1~3 | 400 rpm 5 hr. | 0.804 | 3.305 |
| Sample E | p-type | 0.01~0.02 | 400 rpm 5 hr. | 0.828 | 2.014 |
| Sample F | n-type | 0.0012 | 400 rpm 5 hr. | 0.842 | 2.483 |
| Sample G | n-type | 1900 | 400 rpm 5 hr. | 0.869 | 4.250 |
| Sample H | n-type | 8~12 | 300 rpm 5 hr. | 1.178 | 3.431 |
| Comparative Sample I | p-type | 0.01~0.02 | 400 rpm 5 hr. | 7.428 | 30.86 |

(Fabrication of Negative Electrodes)

Negative electrodes were fabricated by the following method using Samples A to H and Comparative Sample I as negative electrode active materials. Copper foil with a thickness of 18 μm was used as a negative electrode current collector. The negative electrode active material particles (Samples A to H and Comparative Sample I), graphene oxide, and polyimide (more precisely, a precursor of polyimide) as a hinder were mixed at a ratio of 80:5:15 (wt %) in a planetary mixer to form slurry. As a solvent, NMP was used. First, the solvent was added to the negative electrode active material, and they were mixed in a mixer. Then, graphene oxide and NMP were added to the mixture and the obtained mixture was kneaded. After that, a precursor of polyimide and NMP were added to the kneaded mixture and mixing was performed in a mixer. Lastly, NMP was added again to the mixture and mixing was performed in a mixer to form slurry. Mixing was performed at 2000 rpm for 5 minutes. The mixing and kneading were performed 16 times in total. Note that 13.7% of the precursor of polyimide was imidized through a heating step to be polyimide.

Next, heat treatment was performed to hake the slurry and reduce graphene oxide. The heat treatment was performed at 160° C. for 0.5 hours and then, the temperature was increased to 250° C. and the heat treatment was performed at 250° C. for 0.5 hours. Then, the temperature was increased to 370° C., and the heat treatment was performed at 370° C. for 1 hour.

The negative electrodes fabricated using Samples A to H and Comparative Sample I in the aforementioned manner are referred to as Negative Electrodes A to H and Comparative Negative Electrode I.

Figure 3A:
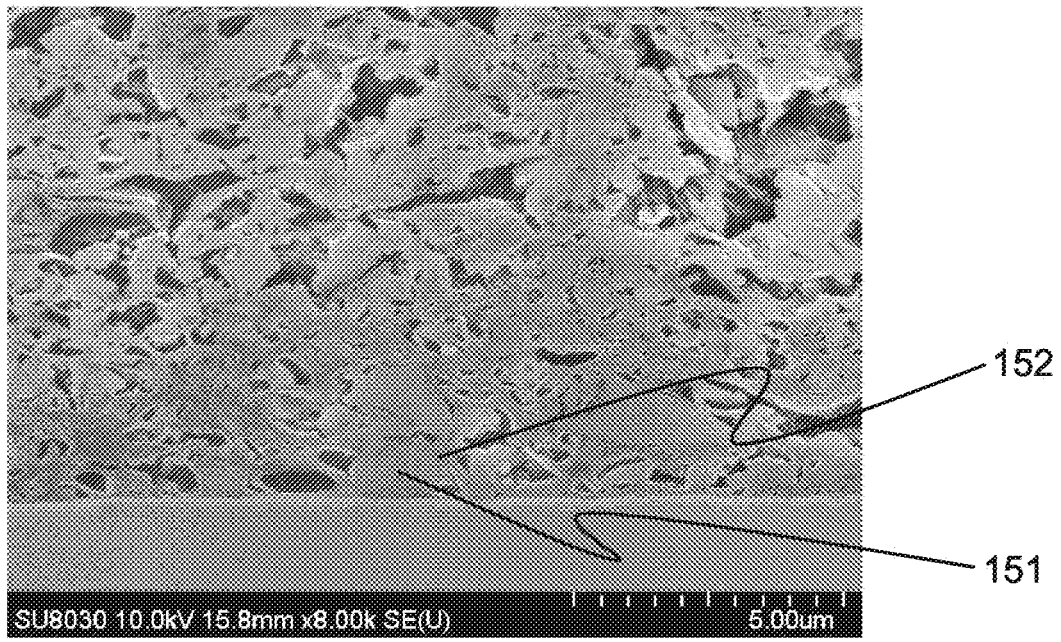
FIGS. 3A and 3B are cross-sectional SEM images of a negative electrode.
Figure 3B:
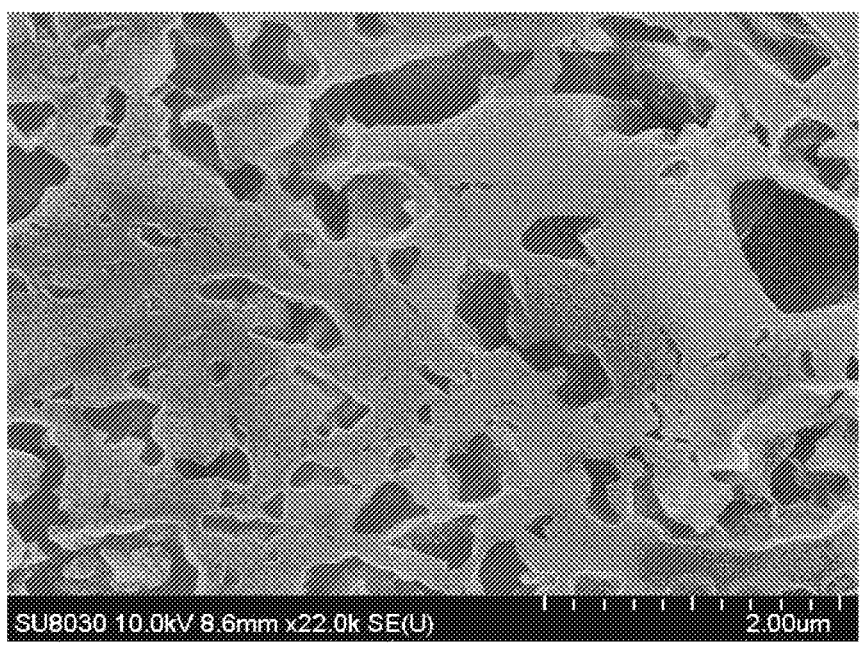
Figure 4A:
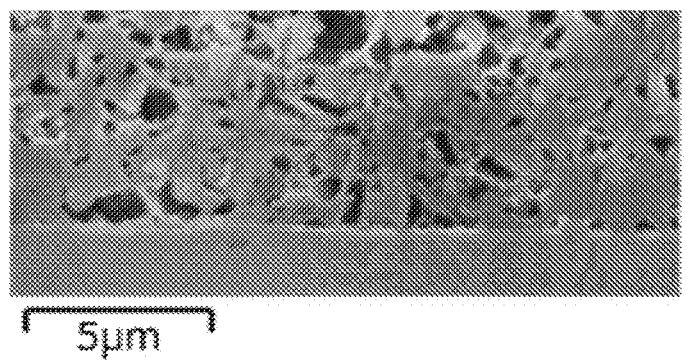
FIGS. 4A to 4C shows cross-sectional images of a negative electrode measured by SEM-EDX.
Figure 4B:
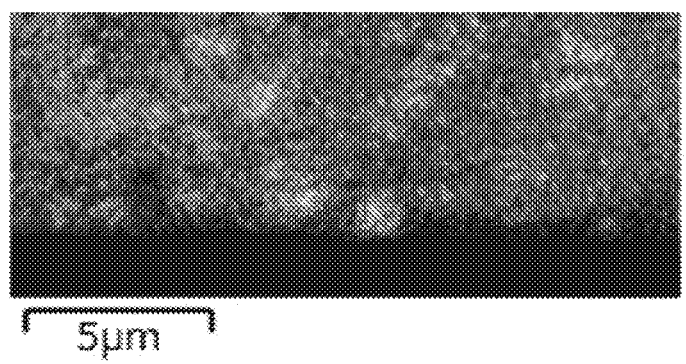
Figure 4C:
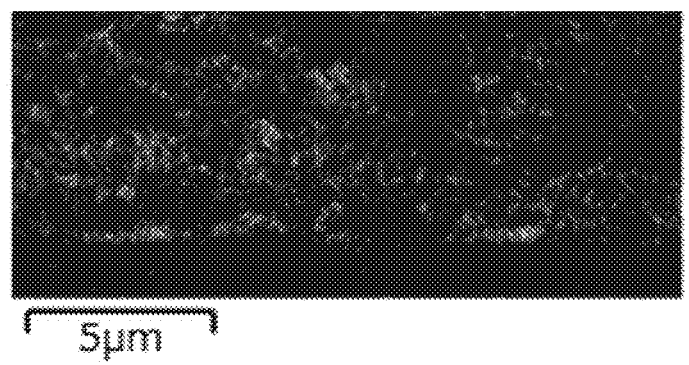

FIGS. 3A and 3B show a cross section of Negative Electrode D fabricated using Sample D in Table 1 that was observed by a scanning electron microscope (SEM). FIGS. 4A to 4C show results of elementary analysis of Negative Electrode D, which was fabricated using Sample D, by SEM energy dispersive X-ray spectroscopy (SEM-EDX). FIG. 4A shows a SEM image. FIG. 4B shows a mapping image of silicon. FIG. 4C shows a mapping image of carbon. As shown in FIGS. 3A and 3B and FIGS. 4A to 4C, graphene 152 was observed between active materials 151. This implies that the active materials 151 and the graphene 152 are favorably dispersed.

Figure 8A:
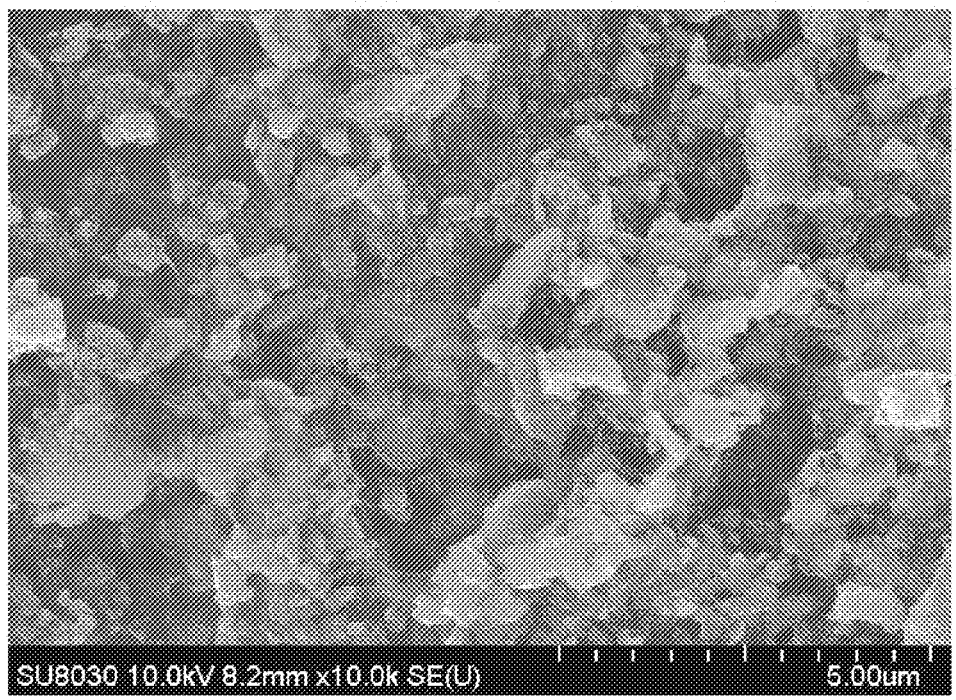
FIGS. 8A and 8B are SEM images of a negative electrode.
Figure 8B:
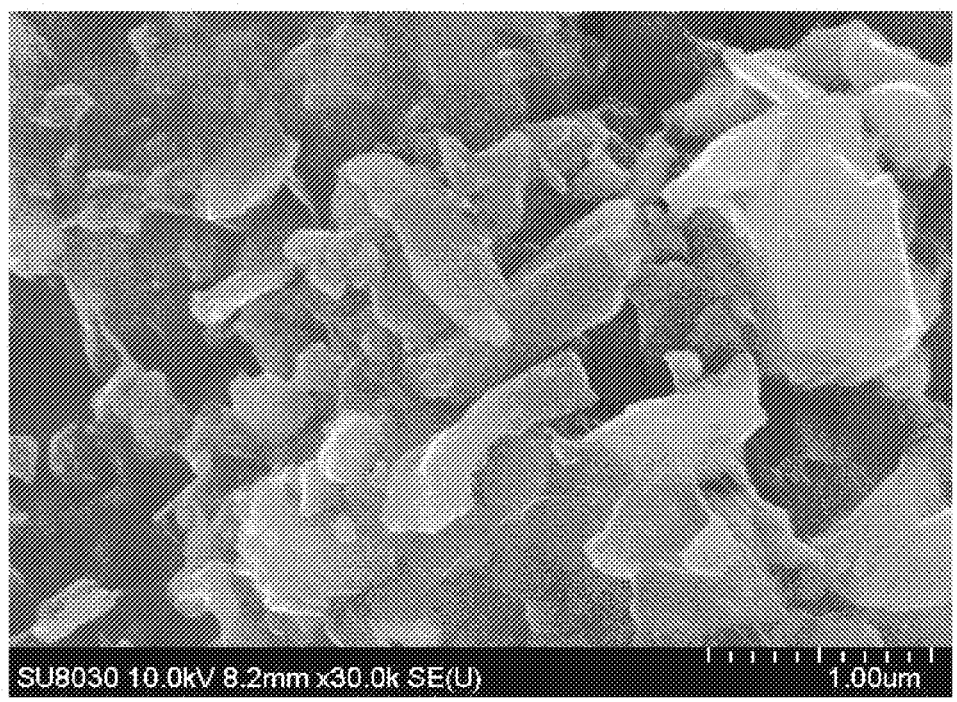

FIGS. 8A and 8B show Negative Electrode D fabricated using Sample D that was observed from above by SEM. FIGS. 8A and 8B show the images observed at magnifications of 10,000 times and 30,000 times, respectively. As can be seen from FIGS. 8A and 8B, the ground silicon has an angular shape. This is presumably because silicon has a plane along which it is easily cloven and is preferentially cloven along the plane when ground. Thus, the cleavage plane of the ground silicon is likely to be exposed on an end surface or a surface. The cleavage planes of silicon are the (111) plane and the (110) plane.

(Fabrication of Cells)

Next, half cells were fabricated using Negative Electrodes A to H and Comparative Negative Electrode I fabricated in the aforementioned manner. For measurement of the properties, a CR2032 coin-type storage battery (with a diameter of 20 mm and a height of 3.2 mm) was used. A metal lithium and polypropylene were used as a counter electrode and a separator, respectively. An electrolytic solution was formed in such a manner that lithium hexafluorophosphate (LiPF$_6$) was dissolved at a concentration of 1 mol/L in a solution in which EC and DEC were mixed at a volume ratio of 3:7. This electrolytic solution is referred to as an electrolytic solution A.

(Measurement of Cells)

Figure 7:
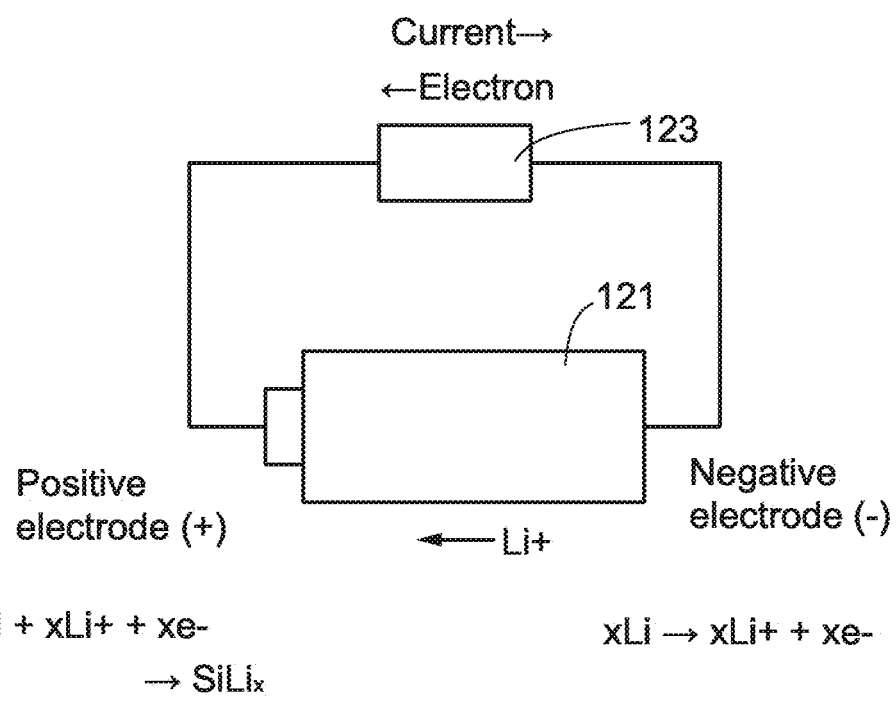
FIG. 7 illustrates the operation of a half cell.

Charge and discharge of the half cells using the silicon electrodes will be described using formulas. FIG. 7 shows a connection structure of a half cell 121 and a load 123 when the half cell including the silicon electrode and the Li counter electrode. When the half cell is discharged, a reaction of Formula (1) occurs at the silicon electrode.

$$Si + xLi^+ + e^- \rightarrow SiLi_x \qquad (1)$$

A reaction of Formula (2) occurs at the Li electrode.

$$xLi \rightarrow xLi^+ + xe^- \qquad (2)$$

Figure 6:
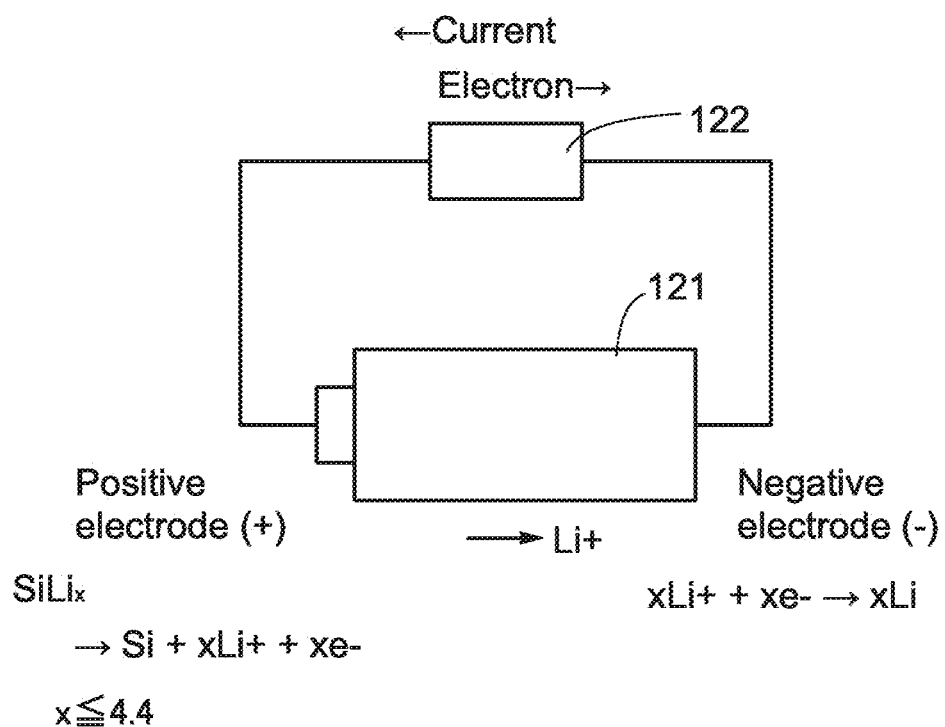
FIG. 6 illustrates the operation of a half cell.

FIG. 6 shows a connection structure of the half cell 121 and a charger 122 when the half cell including the silicon electrode and the Li counter electrode is charged. When the half cell is charged, a reaction of Formula (3) occurs at the silicon electrode.

$$SiLi_x \rightarrow Si + xLi^+ + xe^- \quad (3)$$

A reaction of Formula (4) occurs at the Li electrode.

$$xLi^+ + xe^- \rightarrow xLi \quad (4)$$

Here, in Formulae (1) to (4), x satisfies the relation $x \leq 4.4$.

As indicated by Formulae (1) to (4), Li is intercalated into the silicon in discharging and is deintercalated from the silicon in charging. In other words, the measurement of the half cell starts from the discharging operation.

Next, the measurement conditions of the half cells will be described. The discharge (Li intercalation) of the half cells was performed in the following manner: constant current discharge was performed at a rate of 0.1 C until the voltage reached a lower voltage limit of 0.01 V, and then, constant voltage discharge was performed at a voltage of 0.01 V until the current value reached a lower limit of a current value corresponding to 0.01 C. As the charge (Li deintercalation), constant current charge was performed at a rate of 0.1 C until the voltage reached an upper voltage limit of 1 V.

Table 2 shows the initial charge and discharge efficiencies obtained as a result of charge and discharge.

TABLE 2

| | | Initial charge and discharge efficiency | |
|---|---|---|---|
| Condition | Cell | Efficiency (%) | Efficiency (%): average |
| Negative electrode A | A-1 | 83.4 | 82.7 |
| | A-2 | 82.0 | |
| Negative electrode B | B-1 | 85.5 | 85.5 |
| | B-2 | 85.6 | |
| Negative electrode C | C-1 | 85.8 | 85.9 |
| | C-2 | 85.8 | |
| | C-3 | 86.1 | |
| Negative electrode D | D-1 | 84.1 | 83.95 |
| | D-2 | 83.8 | |
| Negative electrode E | E-1 | 83.5 | 83.25 |
| | E-2 | 83.0 | |
| Negative electrode F | F-1 | 85.8 | 85.5 |
| | F-2 | 85.2 | |
| Negative electrode G | G-1 | 77.3 | 78.1 |
| | G-2 | 77.8 | |
| | G-3 | 79.1 | |
| Negative electrode H | H-1 | 84.0 | 80.0 |
| | H-2 | 82.0 | |
| | H-3 | 74.2 | |
| Comparative negative electrode I | I-1 | 58.0 | 56.5 |
| | I-2 | 55.0 | |

As shown in Table 2, the cells using Negative Electrodes A to F and H have high initial charge and discharge efficiencies of 80% or higher. In contrast, the cell using Comparative Negative Electrode I has a low initial charge and discharge efficiency of 56.5%. Comparative Negative Electrode I was fabricated using Comparative Sample I with an average particle size of 7 μm or more (D90 is 30 μm or more). The large average size of the silicon particles presumably caused insufficient dispersion of a conductive additive and the silicon particles, leading to the loss of a conductive path by expansion and contraction of silicon with charge and discharge and lower capacity. Although Negative Electrode H has a larger particle size than Negative Electrode G, the cell using Negative Electrode H has slightly higher charge and discharge efficiency than the cell using Negative Electrode G. The resistivity of silicon in Negative Electrode G is 1900 Ω·cm, whereas the resistivities of silicon in Negative Electrodes A to F and H are in the range from $10^{-4}$ Ω·cm to 12 Ω·cm. This suggests that reducing the resistivity of silicon can further increase charge and discharge efficiency.

Example 2

In this example, full cells were fabricated using the negative electrodes fabricated in Example 1 and the cycle characteristics thereof were measured.

For measurement of the properties, a CR2032 coin-type storage battery (with a diameter of 20 mm and a height of 3.2 mm) was used. An electrode including LiFePO$_4$ as an active material was used as each of the positive electrodes. As electrolytic solutions, Electrolytic Solution A described above and Electrolytic Solutions B and C using ionic liquids as nonaqueous solvents were prepared. In Electrolytic Solution B, 1,3-dimethyl-1-propylpiperidinium bis(fluorosulfonyl)amide (abbreviation: 3mPP13-FSA) represented by General Formula (G1) was used as a nonaqueous solvent and lithium bis(trifluoromethanesulfonyl)amide (Li(CF$_3$SO$_2$)$_2$N, abbreviation: LiTFSA) was used as an electrolyte. LiTFSA was dissolved in 3mPP13-FSA so as to have a concentration of 1 mol/L. In Electrolytic Solution C, 1-methyl-1-propylpyrrolidinium bis(fluorosulfonyl)amide (abbreviation: P13-FSA) was used as a nonaqueous solvent and LiTFSA was used as an electrolyte. LiTFSA was dissolved in 3mPP13-FSA so as to have a concentration of 1 mol/L. As the separators of Cells 1 to 3, Whatman (registered trademark) glass-fiber filter paper (GF/C) was used. The thickness of each separator was 260 μm. A polypropylene separator was used for Cell 4. Table 3 shows the amounts of the positive electrode active materials, the kinds of the negative electrodes, and the amounts of the negative electrode active materials.

[Chemical Formula 1]

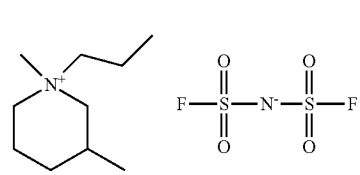

(G1)

[Chemical Formula 2]

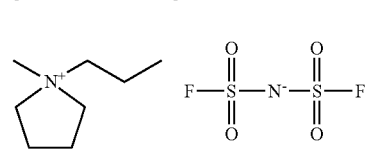

(G2)

TABLE 3

| | | Initial charge and discharge efficiency | | |
|---|---|---|---|---|
| Cell | Negative electrode | Amount of negative electrode [mg/cm$^2$] | Amount of positive electrode [mg/cm$^2$] | Electrolytic solution |
| Cell 1 | Negative Electrode B | 1.2 | 8.0 | Electrolytic solution B |
| Cell 2 | Negative Electrode B | 1.2 | 8.1 | Electrolytic solution C |
| Cell 3 | Negative Electrode A | 1.1 | 9.1 | Electrolytic solution C |

TABLE 3-continued

Initial charge and discharge efficiency

| Cell | Negative electrode | Amount of negative electrode [mg/cm²] | Amount of positive electrode [mg/cm²] | Electrolytic solution |
|---|---|---|---|---|
| Cell 4 | Negative Electrode A | 1.1 | 8.6 | Electrolytic solution A |

Figure 9:
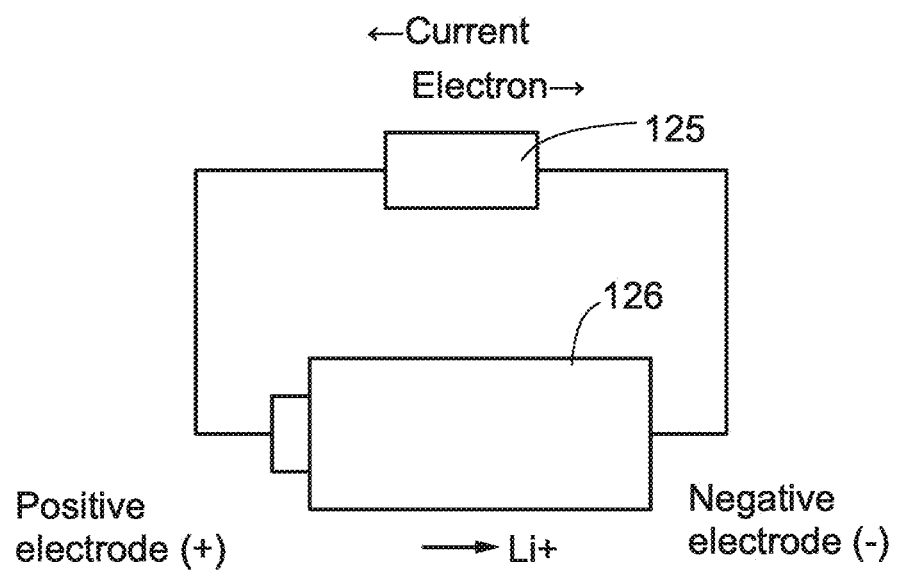
FIG. 9 illustrates the operation of a half cell.

Here, charge and discharge of the full cell using LiFePO$_4$ and a silicon electrode as the positive electrode and the negative electrode, respectively, will be described using formulas. FIG. 9 illustrates the connection structure of a full cell 125 and a charger 126 when the full cell is charged. When the full cell is charged, a reaction of Formula (5) occurs at the positive electrode.

$$z(LiFePO_4) \rightarrow z(Li_{1-y}FePO_4 + yLi^+ + ye^-) \quad (5)$$

A reaction of Formula (6) occurs in the negative electrode.

$$Si + xLi^+ + xe^- \rightarrow SiLi_x \quad (6)$$

Figure 10:
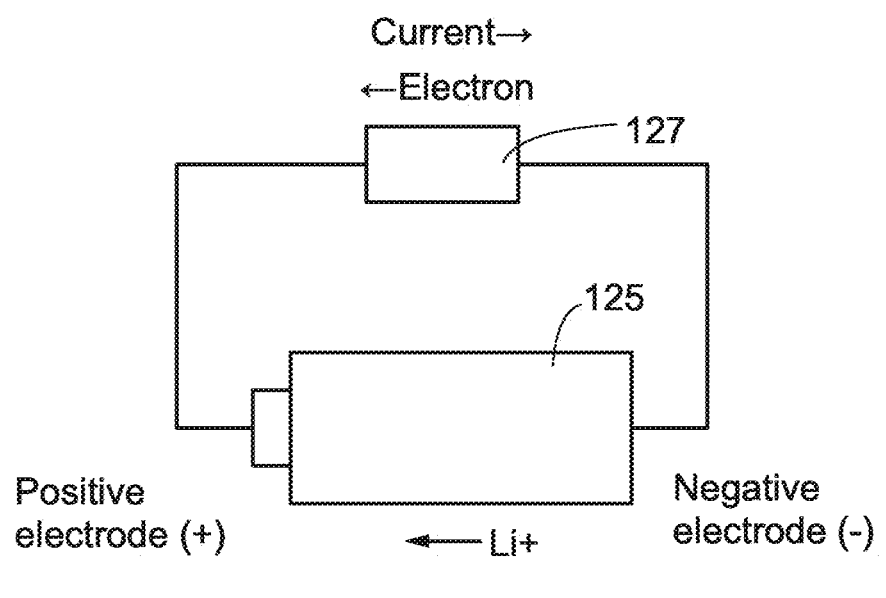
FIG. 10 illustrates the operation of a half cell.

FIG. 10 illustrates the connection structure of the full cell 125 and a load 127 when the foil cell is discharged. When the full cell is discharged, a reaction of Formula (7) occurs at the positive electrode.

$$z(Li_{1-y}FePO_4 + yLi^+ + ye^-) \rightarrow z(LiFePO_4) \quad (7)$$

A reaction of Formula (8) occurs at the negative electrode.

$$SiLi_x \rightarrow Si + xLi^+ + xe^- \quad (8)$$

Here, in Formulae (5) to (8), x satisfies the relation x≤4.4. The product of y and z is equal to x.

As charge and discharge, constant current charge and discharge were performed at a rate of 0.1 C. The upper voltage limit was 4.0 V, and the lower voltage limit was 2 V. The measurement temperature was 25° C. Note that the rate was calculated using the theoretical capacity of LiFePO$_4$ of 170 mAh/g as a reference.

Figure 5:
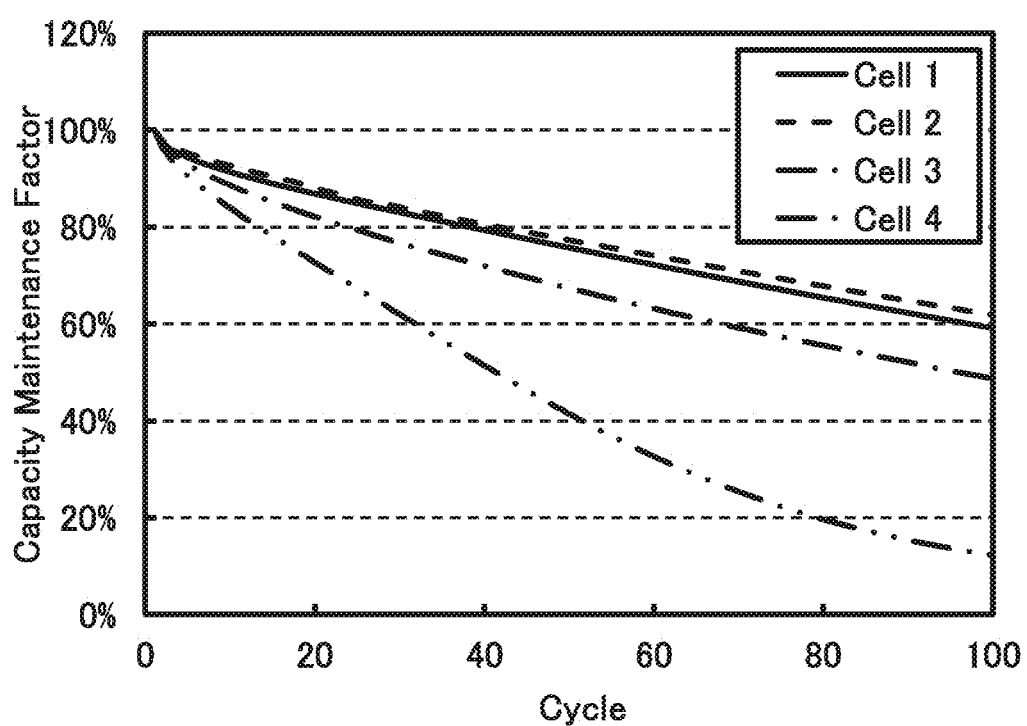
FIG. 5 is a graph showing the cycle characteristics of full cells.

The obtained initial discharge capacities of Cell 1, Cell 2, Cell 3, and Cell 4 were 109.8 mAh/g, 116.7 mAh/g, 106.5 mAh/g, and 110.7 mAh/g, respectively. FIG. 5 shows changes in capacity maintenance factor when the initial discharge capacity is 100%. The results of Cell 1, Cell 2, Cell 3, and Cell 4 are represented by a solid line, a broken like, a dashed-dotted line, and a dashed double-dotted line, respectively. The capacity maintenance factors of Cells 1 and 2 after 100 cycles were approximately 60%, and the capacity maintenance factor of Cell 3 was approximately 50%. There results indicate that all the cells have favorable characteristics. The capacity maintenance factor of the cell using Negative Electrode B was higher than that of the cell using Negative Electrode A. This is presumably because the particle size is larger and the surface area is smaller in Negative Electrode B, and thus the decomposition amount of the electrolytic solution on the surface was smaller. The capacity maintenance factor of Cell 4 using Electrolytic Solution A after 100 cycles was 12%. EC and DEC were used as the solvents of Electrolytic Solution A. The solvent of Electrolytic Solution B was 3mPP13-FSA. The solvent of Electrolytic Solution C was P13-FSA. These ionic liquids are less likely to cause the decomposition reaction of the solvent by charge and discharge than organic solvents such as EC and DEC. This is presumably why the excellent characteristics of the cells using the ionic liquids were achieved.

This application is based, on Japanese Patent Application serial No. 2013-234633 filed with Japan Patent Office on Nov. 13, 2013, the entire contents of which are hereby incorporated by reference.

What is claimed is:

1. A method for manufacturing an electrode, comprising steps of:
   grinding a silicon wafer to obtain silicon particles;
   mixing the silicon particles, graphene oxide, a precursor of polyimide and a first solvent to obtain a slurry;
   forming an electrode by applying the slurry to a current collector and removing the first solvent in the slurry; and
   performing a heat treatment to the electrode at a temperature higher than or equal to 200° C. and lower than or equal to 400° C.,
   wherein the silicon wafer comprises phosphorus or boron as an impurity so as to change a resistivity into a range of $10^{-4}$ Ω·cm to 12 Ω·cm,
   wherein a D90 value of the silicon particles is less than or equal to 3.305 μm,
   wherein an average particle size of the silicon particles are greater than or equal to 0.1 μm and less than or equal to 0.842 μm, and
   wherein the graphene oxide is reduced and the precursor of polyimide makes polyimide in the step of performing the heat treatment.

2. The method for manufacturing an electrode according to claim 1, wherein grinding the silicon wafer comprises steps of grinding in a mortar and grinding by a planetary ball milling.

3. The method for manufacturing an electrode according to claim 1, wherein the silicon wafer has one plane direction of a (100) plane.

4. The method for manufacturing an electrode according to claim 2, wherein the planetary ball milling is a wet ball milling.

5. The method for manufacturing an electrode according to claim 1, wherein performing the heat treatment reduces the graphene oxide into graphene.

6. The method for manufacturing an electrode according to claim 1,
   wherein the precursor of polyimide is imidized by the heat treatment.

7. The method for manufacturing an electrode according to claim 6,
   wherein performing the heat treatment reduces the graphene oxide into graphene, and
   wherein a rate of the graphene to the silicon particles is lower than or equal to 3% in the electrode obtained after the step of the heat treatment.

8. The method for manufacturing an electrode according to claim 7,
   wherein the electrode after the heat treatment has an initial charge and discharge efficiency higher than 80% under a discharge condition of a first constant current discharge and a second constant voltage discharge and a charge condition of a first constant current charge,
   wherein the first constant current discharge is performed at a rate of 0.1 C until a voltage of the electrode reaches 0.01 V,
   wherein the second constant voltage discharge is performed at a voltage of 0.01 V until a current value of the second constant voltage discharge reaches a current value corresponding to 0.01 C, and wherein the first constant current charge is performed at a rate of 0.1 C until a voltage of the electrode reaches 1 V.

\* \* \* \* \*